(12) United States Patent
Khandekar

(10) Patent No.: US 6,732,102 B1
(45) Date of Patent: May 4, 2004

(54) AUTOMATED DATA EXTRACTION AND REFORMATTING

(75) Inventor: Pramod Khandekar, Edison, NJ (US)

(73) Assignee: InstaKnow.Com Inc., Edison, NJ (US)

(*) Notice: Subject to any disclaimer, the term of this patent is extended or adjusted under 35 U.S.C. 154(b) by 348 days.

(21) Appl. No.: 09/714,644

(22) Filed: Nov. 16, 2000

Related U.S. Application Data

(60) Provisional application No. 60/174,747, filed on Jan. 4, 2000, provisional application No. 60/171,143, filed on Dec. 16, 1999, and provisional application No. 60/166,247, filed on Nov. 18, 1999.

(51) Int. Cl.[7] ............................................. G06F 17/30
(52) U.S. Cl. ........................ 707/10; 715/513; 345/760; 345/764; 345/854
(58) Field of Search ................ 707/1, 3–6, 100–154.1, 707/9–10; 715/513, 501.1; 345/760, 764, 854

(56) References Cited

U.S. PATENT DOCUMENTS

| | | | | |
|---|---|---|---|---|
| 5,664,109 A | * | 9/1997 | Johnson et al. | 705/2 |
| 6,014,680 A | * | 1/2000 | Sato et al. | 715/513 |
| 6,138,129 A | * | 10/2000 | Combs | 707/6 |
| 6,222,847 B1 | * | 4/2001 | Ball et al. | 370/410 |
| 6,304,870 B1 | * | 10/2001 | Kushmerick et al. | 707/4 |
| 6,405,221 B1 | * | 6/2002 | Levine et al. | 715/501.1 |
| 6,424,980 B1 | * | 7/2002 | Iizuka et al. | 715/513 |
| 6,516,308 B1 | * | 2/2003 | Cohen | 706/12 |
| 6,538,673 B1 | * | 3/2003 | Maslov | 345/853 |
| 6,564,254 B1 | * | 5/2003 | Shoji et al. | 709/217 |

OTHER PUBLICATIONS

Eikvil. Information Extraction from World Wide Web—A Survey. 1999. pp. 1–39.*
Webpages from webMethods website "Resolve Complex B2B Integration Challenges Once and for All" (www.webmethods.com).
Webpages from Knowmadic Inc. website (www.knowmadic.com).
Webpages from Aonix website (www.aonix.com) © 1999.
Webpages from Vignette website "The Right Content in the Right Context at the Right Time" (www.vignette.com) © 1996–2000.
Brochure, "Vignette eContent," Vignette © 1997–2000.

* cited by examiner

Primary Examiner—John Breene
Assistant Examiner—Mohammad Ali
(74) Attorney, Agent, or Firm—Lerner, David, Littenberg, Krumholz & Mentlik, LLP

(57) ABSTRACT

A system and method for automated browsing and data extraction from Internet Web sites. Our preferred method and system selects various data elements within the Web site during a design phase and extracts data from the Web site based on the matching of the selected data elements at the Web site during a playback phase. Another preferred method and system extracts XML data based on matching previously selected XML data elements during a design phase with XML data elements present during a playback phase, and reformats the extracted XML data into a relational format.

33 Claims, 27 Drawing Sheets

FIG. 3

| 30 | 32 | 34 | 36 | 38 | 40 | 42 | 44 | 46 | 48 | 50 | 52 |
|---|---|---|---|---|---|---|---|---|---|---|---|
| Row | H-TML T-AG(R) | TagType | VisibleText | Page ID | Base | Check | Variable Name | Tal | TCI | When Al known | Stop At |
| 3 | 19 | IMG | Yahoo! Finance | ☒ | ☒ | ☒ | | 0 | 0 | | |
| 10 | 21 | TEXT | | ☒ | ☒ | ☒ | | | | | |
| 11 | 22 | SUBMIT | | ☒ | ☒ | ☒ | | | | | |
| 12 | 23 | SELECT | Basic | ☒ | ☒ | ☒ | | | | | |
| 21 | 48 | TD | Quotes | ☒ | ☒ | ☒ | | 10 | 10 | | |
| 45 | 83 | P | Tue Oct 19 11:14am ET - U.S. Markets | ☒ | ☒ | ☒ | Group1.Date&Time | 5 | 5 | | |
| 46 | 87 | TH | Symbol | ☒ | ☒ | ☒ | | 10 | 10 | | |
| 52 | 94 | A | MSFT | ☒ | ☒ | ☒ | Group2.Stock_Name | | | Row1 | Recent News |
| 53 | 95 | TD | 10:53AM | ☒ | ☒ | ☒ | Group2.Stock_Time | | | Row1 | |
| 54 | 96 | TD | 60 | ☒ | ☒ | ☒ | Group2.Stock_Value | | | Row1 | |
| 55 | 98 | TD | +1/8 | ☒ | ☒ | ☒ | Group2.Stock_Chng | | | Row1 | |
| 56 | 101 | TD | +0.14% | ☒ | ☒ | ☒ | Group2.Stock_PerCh | | | Row1 | |
| 57 | 102 | TD | 10,827,100 | ☒ | ☒ | ☒ | Group2.Stock_Volume | | | Row1 | |

SOURCE          The URL or the file-name used in Design mode

TIME            Seconds to wait for response from website at runtime

The following section of data is repeated for each of the User-Clicked nodes:

DATA-ISLAND     Name of the DataIsland(if any)

PARENT-PATH     Full path of the node the user had selected

TO-BE-EXTRACTED The user selected node's immediate children's path

ROWS-TO-EXTRACT Rows to be extracted for this particular selection

VARIABLE-NAME   User-defined business name for the whole table of relational data to be generated DESCRIPTION     Description for this selection (optional)

FIG. 23

AUTOMATED DATA EXTRACTION AND REFORMATTING

CROSS-REFERENCE TO RELATED APPLICATIONS

This application claims the benefit of U.S. Provisional Application No. 60/174,747, filed Jan. 4, 2000, U.S. Provisional Application No. 60/166,247, filed Nov. 18, 1999, and U.S. Provisional Application No. 60/171,143, filed Dec. 16, 1999, the disclosures of which are hereby incorporated by reference herein.

FIELD OF THE INVENTION

The present invention relates to a method and system for automated browsing and data extraction of data found at global communication network sites such as Web sites that include HTML or XML data.

BACKGROUND OF THE INVENTION

The Internet is becoming the de facto default network for people and computers to connect to each other because of its truly global reach and its free nature. HTML (HyperText Markup Language) is the widely accepted standard for human interaction with the Internet and particularly the World Wide Web (the "Web"). HTML, in conjunction with a browser, allows people to communicate with other people or computers at the other end of the network.

The Internet can also be viewed as a global database. A large amount of valuable business information is present on the Internet as HTML pages. However, HTML pages are meant for human eyes, not for a computer to read them, posing serious limitations on how that information can be used in an automated manner.

HTML Web pages are built as HTML tags within other tags, in effect forming a "tree". Certain automated browsers interpret the hierarchy and type of tags and render a visual picture of the HTML for a user to view. HTML data-capture technology currently available follows a paradigm of "design" and "run" modes. In design mode, a user (e.g., a designer), through software, locates Web sites and extracts data from those sites, by way of an "example". The software program saves the example data and in the "run" mode, automatically repeats the example for the new data. However, most Web pages can, and do, change as frequently and as much as their Webmaster desires, sometimes changing the tree hierarchy completely between design time and run time. As a result, reliable extraction of data, including business data, from an HTML page becomes a challenging task.

There are certain known methods for extracting this information. For example, OnDisplay Inc. of San Ramon, Calif. has a "CenterStage eContent" product that can access, integrate and transform data from multiple HTML pages. OnDisplay's HTML data recognition algorithm works by remembering the depth and location of the required business information within the HTML "tree" between the design and run modes.

As another example, Neptunet Inc., of San Jose, Calif., provides for a system comprising a method, whereby, after getting the Web data, all further processing of that data has to be programmatically specified. Neptunet's HTML data recognition algorithm works by remembering the depth and location of the required business information within the HTML "tree" between the design and run modes.

Other HTML data capture mechanisms include methods whereby HTML data extraction is performed by specifying (i.e., hard coding) the exact HTML tag number of the data to be extracted using a programming language such as Visual Basic or Visual C++. The drawbacks of these types of methods is that at the slightest change in the appearance of the Web page, the program has to be changed, making it an impractical solution for reliable data processing solutions.

HTML is a very useful information presentation protocol. It allows visually pleasing formatting and colors to be set for data being presented to make it more understandable. For example, a stock price change can be shown in green color if the stock is going up and in red if the stock is going down, making the change visually and intuitively more understandable.

But more and more, the Internet is also being used for machine to machine (i.e., computer to computer) communications. While HTML is a wonderful mechanism for the purpose of human interaction, it is not ideally-suited for computer to computer communication. It has the main disadvantage for this purpose that there is no way for the data being sent to be described as "what" the data is supposed to represent. For example, a number "85" appearing on a Web stock trading screen in the browser may be the stock price or the share quantity. The data just gets shown in the browser and it is the human being looking at the browser who knows what numbers mean what because of casual context information shown around the data. But in machine to machine communication, the receiving computer lacks the context resolution intelligence and has to be told very specifically that the number "85" is the stock price and not the share quantity.

The need for correct and specific understanding of the data at the receiving computer's end has been conventionally satisfied via EDI (Electronic Data Interchange), where the sending and receiving computers have to be synched up to agree on the sequence, length and format of the data elements that can be sent as a complete message. This mechanism, while it works, is cumbersome because of the prior agreement required between the two computers and hence can be used effectively only in a network of relatively few computers in communication with one another. It does not work in an extremely large network like the Internet.

The void of clarity of data definition in a large network is being filled today by a new Internet protocol called XML (Extensible Markup Language). XML provides a perfect solution to specify explicitly and clearly what each number reaching the receiving computer is supposed to be. XML has a feature called "tags" which go with the data and describe what the data is supposed to be. For example, the stock price will be sent in a XML stream as:

<Stock Price> 85 </Stock Price>

The "/" in the second tag signifies that the data description for that data element is complete. Other tag pairs may follow, describing and giving values of other data elements. This allows computer to computer data exchange without needing a prior agreement between the computers about how the data is formatted or sequenced. additionally, XML is capable of showing relationships between pieces of data using a "tree" or hierarchical structure.

But XML has its own unique problems. While useful as data definition mechanisms, XML tree structures cannot be fed to existing data manipulation mechanisms operating on relational (tabular) data formats using well known languages like SQL.

It is believed that OnDisplay, Neptunet and WebMethods are companies allowing a fairly user-friendly design time specification of XML data interchange between computers, saving the specifications and reapplying them at a later point in time on new data. Several companies offer point-and-click programming environments with varying capabilities. Some are used to generate source code in other programming languages, while others execute the language directly. Examples are Visual Flowcoder by FlowLynx, Software-through-pictures by Aonix, ProGraph by Pictorius, LabView by National Instruments and Sanscript by Northwoods Software. All of these methods lack the critical built-in ability to capture and use Web based (HTML/XML) real-time data.

SUMMARY OF THE INVENTION

One aspect of the present invention provides a computer-implemented method for automated data extraction from a Web site. The method comprising: navigating to a Web site during a design phase; extracting data elements associated with the Web site and producing a visible display corresponding to the extracted data elements; selecting and storing at least one Page ID data element in the display from the data elements; selecting and storing one or more Extraction data elements in the display; selecting and storing at least one Base ID data element having an offset distance from the Extraction elements; setting a tolerance for possible deviation from the offset distance; and renavigating to the Web site during a playback phase and extracting data from the Extraction data elements if the Page ID data element is located in the Web site and if the offset distance of the Base ID data element has not changed by more than the tolerance.

Preferably, the user-specific information is entered into the Web site and used in connection with producing the data to be extracted from the Extraction data elements. The data elements preferably are HTML elements. The visible display may comprise a grid containing rows and columns including information about each the data elements extracted. Desirably, the information comprises, for each data element, fixed information of grid row number, HTML tag number and visible text, and user-selected information of Page ID, Base ID, Extract and tolerance. Also preferred, a position of the Page ID data element within the Web site is stored and the extracting occurs during the playback phase if the Page ID data element has not changed position. Further, the Page ID data element is desirably selected as a data element that is unlikely to change position upon reformatting of the Web site and the display contains data desired to be extracted.

Another aspect of the present invention provides a computer-implemented method for automated data extraction from a Web site, comprising: navigating to a Web site during a design phase; extracting data elements associated with the Web site and producing a visible current display grid corresponding to the extracted data elements; selecting and storing at least one Page ID data element in the current display from the data elements; selecting and storing one or more Extraction data elements in the current display; selecting and storing at least one Base ID data element in the current display having an offset distance from the Extraction elements; entering a tolerance in the current display for possible deviation from the offset distance; displaying a playback display grid during a playback phase with the selected Page ID data element, the Extraction data elements, and the Base ID data element; renavigating to the Web site; extracting data elements associated with the Web site to the visible current display grid; and comparing the extracted data elements in the current display grid with the playback display grid and extracting data from the Extraction data elements if the Page ID data element is found in the current display grid and if the offset distance of the Base ID data element has not changed by more than the tolerance. Preferably, the tolerance comprises a forward and backward tolerance.

A further aspect of the present invention provides a computer-implemented method for automated browsing of Web sites on a global communications network and for extracting usable data, comprising: accessing at least one Web site page containing data, wherein the data comprises a hierarchy of HTML tags; transforming the hierarchy of tags into a computer-readable list; identifying a base data element from the list; identifying an offset from the base data element to the usable data; and extracting the usable data for use by a user regardless of changes to the Web site, provided that the offset between the base data element and the usable data does not change. Desirably, the offset is identified during a design phase and saved for use in a run time phase, which extracts the usable data.

Another aspect of the present invention provides a computer-implemented method for automated browsing Web sites and for extracting usable data, comprising: filling a current display grid with rows of HTML data elements from at least one Web site page currently selected by a Web browser; displaying in a playback display grid previously-stored HTML data elements; examining the rows of the playback grid to locate an HTML data element previously selected as a Page ID data element; comparing the rows of the current grid to locate an HTML element that matches the Page ID data element; examining the rows of the playback grid to locate HTML data elements previously selected as Extraction data elements and a Base ID data element used as a reference for locating the Extraction data elements; comparing the rows of the current grid to locate HTML elements that match the Extraction data elements and match the Base ID data element; and extracting data from the Extraction data elements regardless of changes to the Web site, provided that the Page ID elements match and any offset between the Base ID elements is within a predetermined tolerance.

A still further aspect of the present invention provides a computer-based system for automatically browsing Web sites, comprising a client computer and a server computer for receiving requests from the client computers over a network connecting the client and server computers, the client computer running an application to: navigate to a Web site during a design phase; extract data elements associated with the Web site and produce a visible display corresponding to the extracted data elements; select and store at least one Page ID data element in the display from the data elements; select and store one or more Extraction data elements in the display; select and store at least one Base ID data element having an offset distance from the Extraction elements; set a tolerance for possible deviation from the offset distance; and renavigate to the Web site during a playback phase and extract data from the Extraction data elements if the Page ID data element is located in the Web site and if the offset distance of the Base ID data element has not changed by more than the tolerance.

Another aspect of the instant invention provides a computer-implemented method for automated XML data extraction, comprising: identifying selections of XML data elements for extraction from a source of XML data comprising XML data stored in XML format; storing information related to the identified selections of XML data elements for subsequent use; acquiring the source of XML data and retrieving the XML data elements; comparing the retrieved XML data elements to the identified selections and extracting only the data from the XML data elements that correspond to the identified selections; and reformatting the extracted XML data into a relational format. The source of XML data can be a Web site or a file. The extracted data may be saved into a relational data table, and the reformatted extracted XML data is passed to a calling application.

A further aspect of the instant invention provides a computer-implemented method for automated XML data extraction, comprising: navigating to a Web site containing XML data; identifying selections of XML data elements for extraction from the Web site, the XML data comprising data elements containing the data stored in XML format; storing information related to the identified selections of XML data elements for subsequent use; re-navigating to the Web site and retrieving the XML data elements; comparing the retrieved XML data elements to the identified selections and extracting only the data from the XML data elements that correspond to the identified selections; and reformatting the extracted XML data into a relational format. The extracted data is desirably saved into a relational data table.

A yet further aspect of the present invention provides a computer-implemented method for automated XML data extraction, comprising: navigating a client computer to a Web site containing XML data; generating a graphical tree structure on the client computer to display XML nodes and subnodes representing the XML data at the Web site; selecting one or more of the nodes and/or subnodes from the tree structure associated with the data to be extracted; storing information related to the selected nodes and/or subnodes; renavigating the client computer to the Web site and retrieving the XML data using the information; comparing the retrieved XML data with the selected nodes and/or subnodes and extracting only the data corresponding to the selected nodes and/or subnodes; and reformatting the extracted XML data into a relational format. Desirably, selecting one subnode under a parent node automatically selects all subnodes under the parent node.

Another aspect provides a computer readable medium storing a set of instructions for controlling a computer to automatically extract desired XML data from a source of XML data, the medium comprising a set of instructions for causing the computer to: identify selections of XML data elements for extraction from a source of XML data comprising XML data stored in XML format; store information related to the identified selections of XML data elements for subsequent use; acquire the source of XML data and retrieve the XML data elements; compare the retrieved XML data elements to the identified selections and extract only the data from the XML data elements that correspond to the identified selections; and reformat the extracted XML data into a relational format.

A still further aspect provides a computer-based system for automated XML data extraction, comprising a client computer and server computer for receiving requests from the client computer over a network connecting the client and server computers, the client computer running an application to: identify selections of XML data elements for extraction from a source of XML data contained at the server computer and comprising XML data stored in XML format; store information related to the identified selections of XML data elements for subsequent use; acquire the source of XML data and retrieve the XML data elements; compare the retrieved XML data elements to the identified selections and extract only the data from the XML data elements that correspond to the identified selections; and reformat the extracted XML data into a relational format.

BRIEF DESCRIPTION OF THE DRAWINGS

FIG. 3 is a depiction of the design grid used in accordance with a preferred embodiment of the present invention.

FIG. 22 is a chart listing items that are written to a file storing the various user-entered information to be used in accordance with a second embodiment of the present invention.

FIG. 23 is a depiction of the arrangement of the file in its stored format.

DETAILED DESCRIPTION OF PREFERRED EMBODIMENTS

The present invention provides various preferred embodiments to provide a unique, instantly deployable business solution construction and delivery mechanism to make use of live Web data and conventional data. The present invention, in the embodiments described below, is preferably implemented in the form of software forming a computer program that is adapted to run on a computer. Preferably, the computer is a client side computer which is adapted to connect to a server side computer. More preferably, the computers are connected via the Internet, with the client computer running a program to allow Web browsing and the server computer running a Web server program, as is typical with Internet and Web communications.

The program preferably provides a user interface in which the user can manipulate during a design phase and later call back saved settings during a playback phase. The program can be stored on various types of storage media such as floppy disks, CD ROM, hard disk, RAM, etc. and is preferably installed on the client computer. In a typical setup, a Web server is adapted to connect to the Internet or Web in a typical way to deliver Web pages to client computers. Client computers run the program implementing the various embodiments of the present invention which allow browsing of Internet Web sites, data extraction from such Web sites and reformatting of the data found at such Web sites. Client computers connect to the Internet in a typical fashion (e.g., dial-up access, cable modem, DSL, T-1 connection, etc.). Client computers typically include standard operating systems such as Microsoft Windows (CE, 95, 98, NT, 2000), MAC OS, DOS, Unix, etc. Client computers can comprise other devices beyond PCs which can connect to the Web in a wired or wireless fashion, such as PDAs, notebook computers, mobile phones, etc.

Figure 1A:
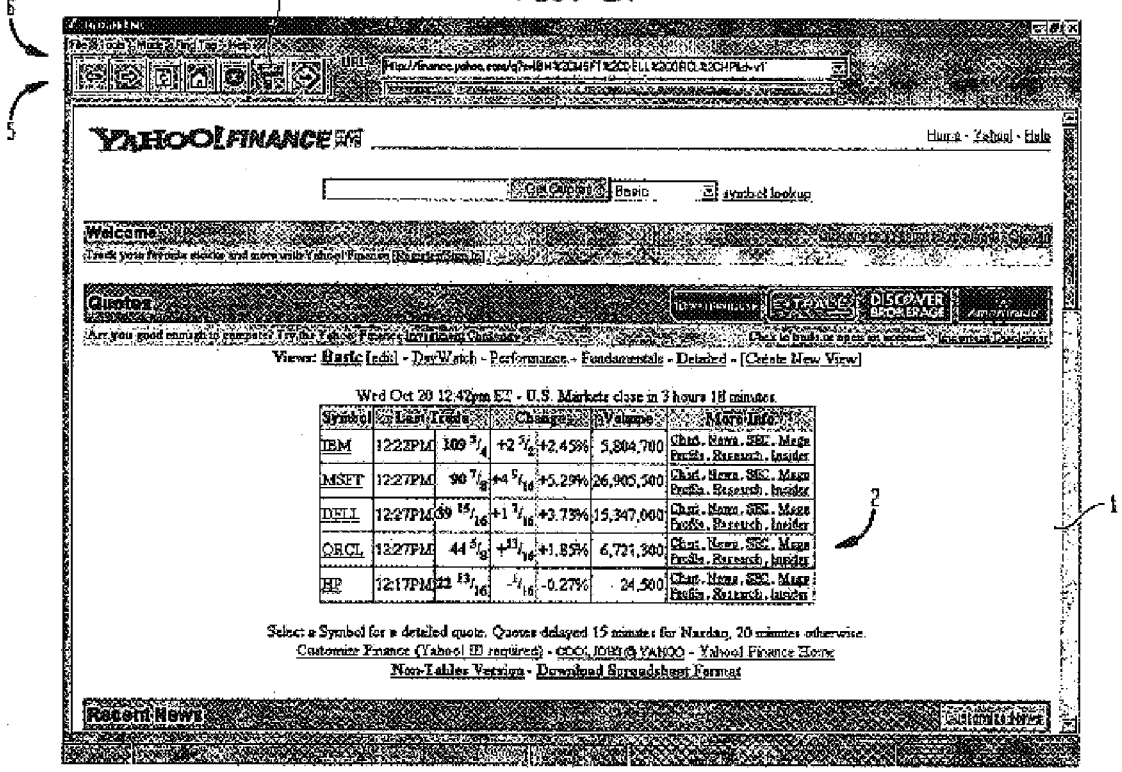
FIG. 1A is a depiction of the program user interface used in accordance with a preferred embodiment of the present invention, displaying an HTML screen from a Web page.

In a preferred embodiment of the present invention, a method and system is provided for automated browsing and data extraction from Web sites that include HTML data. Some Web pages, however, embed other types of data such as data stored in formats such as Microsoft Word or Excel or in Adobe Acrobat (PDF files). The present invention can also automatically detect that a Web page is not an HTML page and still extract the correct data from other such file types. FIG. 1A is a screen shot of a typical Internet HTML screen from a Web site 1 as it appears to the user, showing useful information like current prices for five stocks in a chart 2, which stocks are Microsoft, IBM, DELL, Oracle, and Hewlett-Packard. The present invention is preferably in the form of a Web browser application 4, which looks like a normal Web browser screen, but has additional buttons 5 and menu options 6 on the top. The application is programmed to bring up additional specific screen elements when certain buttons 5 are pressed on the top menu bar.

Figure 1B:
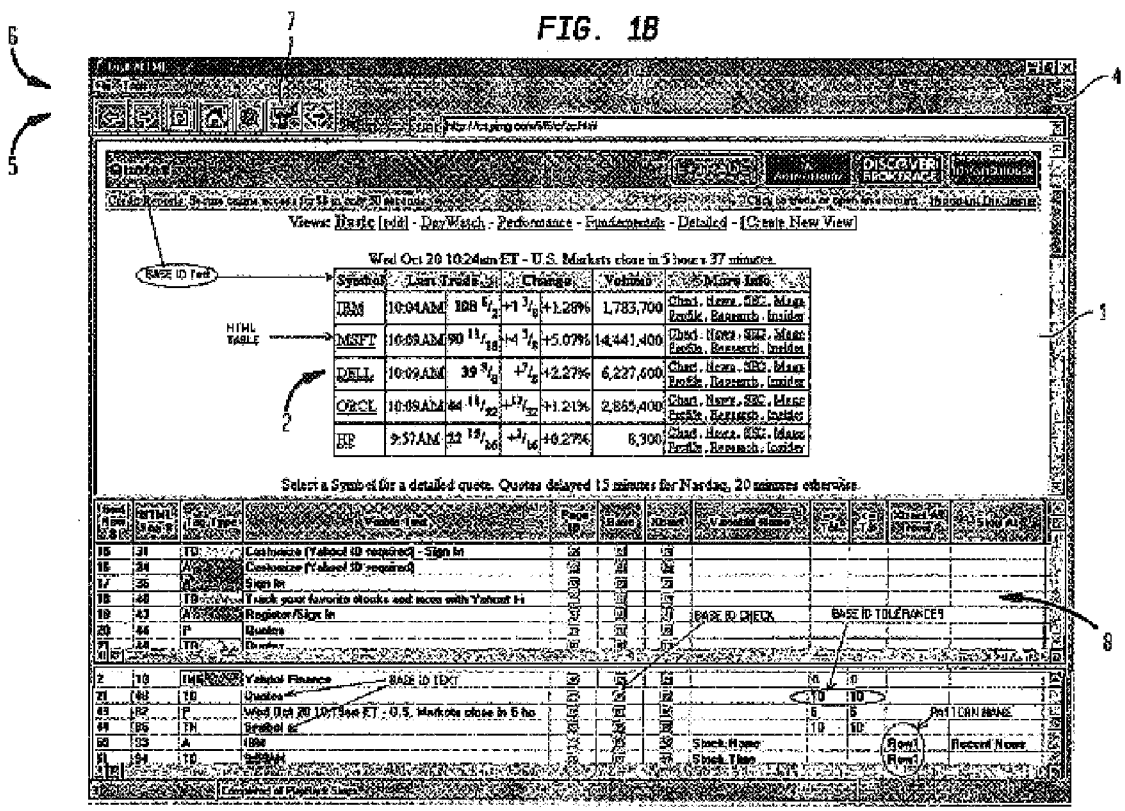
FIG. 1B is a depiction of the user interface showing the current and playback grids.

A preferred embodiment of the present invention included a built-in Web browser that is used to actually navigate the Web. In addition, this browser can accept commands from a program in addition to command from a user. The present invention is preferably implemented in two stages, a design phase and a playback phase. In the design phase, when the user wants to start recording the sequence of automatic navigation/extraction steps, the user clicks on the "Record" button 7 on the menu bar. As shown in FIG. 1B, this action preferably produces a design grid 8 at the bottom of the Web browser that displays the content of the current page loaded in the Web browser (here the URL of the page is http://us.yimg.com/i/fi/c/zc.html).

At this point, the user can give instructions in the design grid 8 relevant to what information from the Web page needs to be extracted, which information needs to be entered in which entry slot on this screen, and which button or hyperlink needs to be pressed for the next Web page to show up. As described in more detail below, checking the appropriate check boxes and entering information in the appropriate row in the grid achieves these actions.

The process of understanding which Web page is currently being processed, what data is to be entered on which element on the page, which buttons or links are to be clicked, and retrieving desired pieces of information from the Web page (i.e., all processing that happens on a single Web page) is referred to herein as a "step". Many pages can be processed one after another in a continuous string. The string, referred to herein as a "surflet" because it contains information on surfing one specific site for one specific purpose, can be saved under a special user given name as an XML file and can be re-used again in the future to achieve exactly the same navigation and data extraction from the same site but for new, refreshed data.

For example, once saved by the designer, the stock information surflet can be played back automatically by other users for their own customized list of stocks (say Wal-Mart and AOL) as desired by a program. There is no relationship between the stock list used at design time and the actual stock list used at playback time. As long as the same Web page supplies the same business information in a similar layout, the recorded instructions can be played back automatically.

In the playback phase, a user or a program tells the program which saved (recorded) surflet is to be played back and with what input parameters. In this example, the input parameters are the stocks the particular user is interested in. The steps within the surflet are repeated (played back) automatically and the extracted new business information is returned to the user or program initiating the request.

In the event that the Web page layout changes drastically, or if the Web server is down at playback time, the program will return to the caller with a message explaining why the surflet could not find what it was instructed to find.

Even though the above example is for stocks, this aspect of the present invention can be applied to automatically navigate and extract any type of data from Web pages from any Web site.

Figure 2:
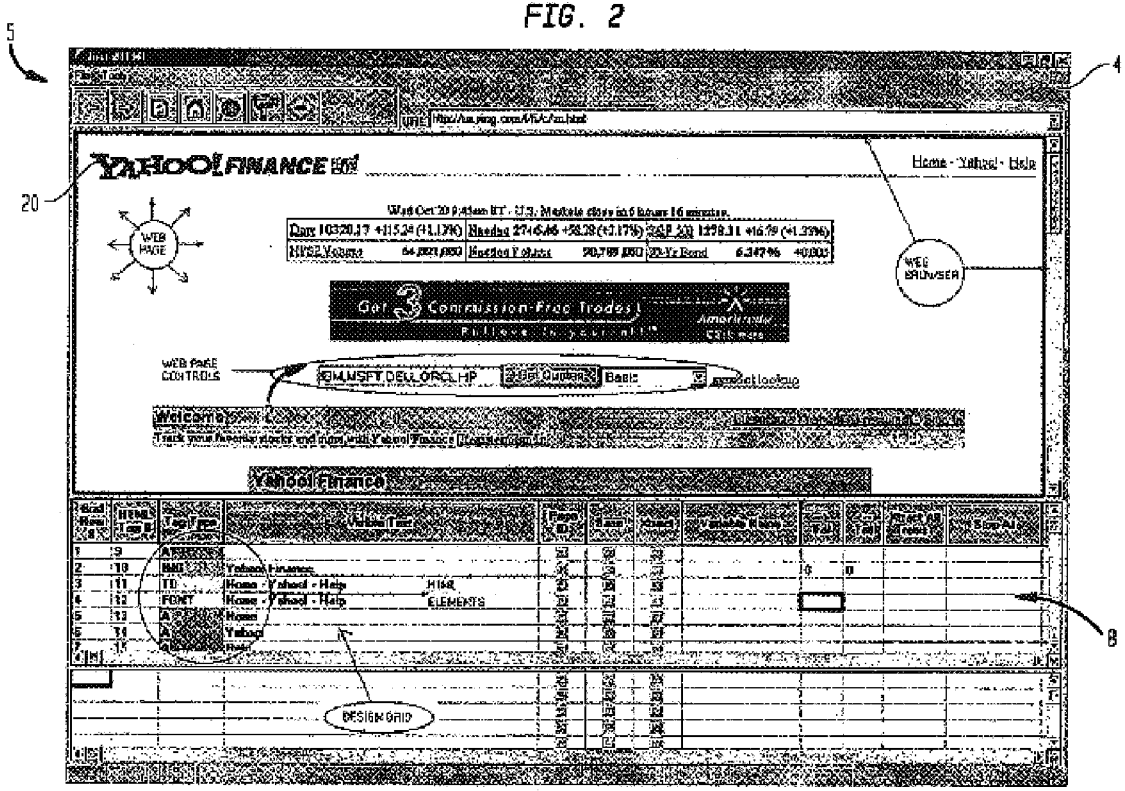
FIG. 2 is a depiction of the user interface displaying one Web page of a Web site and the design grid.

Details of the design phase of the HTML aspect of the present invention now follow. FIG. 2 shows the user interface of the program, depicting a Web browser component 4, design grid 8, and menu buttons 5.

By way of background, a Web browser is an application that displays information from the Internet in page format. Microsoft Internet Explorer 4.0, Netscape 4.6, and Eudora are examples of a Web browser. A Web page is a visible interface written in HTML language that displays information over the Internet. The HTML language is a finite set of formatting tags that are read by the Web browser, which decides how to present the information as a Web page. When a Web page is loaded inside a Web browser, the Web browser parses the formatting tags inside the Web page, and creates a "tree-like" structure in its memory, based on the relation of the tags to each other. This internal tree-like memory structure is referred to herein as a "Web document." It is normally not shown to the user and is required only if a user or an application wants to manipulate the content or information on the Web page programmatically.

A Web page written in HTML language consists of numerous formatting tags. When a Web page is read by the Web browser, the formatting tags inside the Web page are identified by the Web browser as HTML elements. The HTML elements are read from top down, and are arranged in a hierarchical fashion. If one element has other elements inside it, those elements are treated as child elements, and are at a level lower than the original element in the hierarchy.

When a Web page is loaded, the HTML elements that constitute a Web page are read by the Web browser in an ascending order, and are assigned a number (starting from 1) for identification. This number is called the "source index" of that HTML element.

The type of HTML elements that can accept information, or which allow the information presented to be changed, are called "Web page controls." In short, these Web page controls allow user interaction to change its content. Examples of Web page controls are TEXT, TEXTAREA, CHOICE, SELECT, RADIO, SUBMIT, RESET, and PASSWORD.

The design grid 8 is an mechanism which displays the information about the HTML elements in the HTML document currently loaded in the Web browser. The design grid 8 has several columns, some of which describe the properties of the HTML tags, and others which accept information from the user on what to extract and how to extract. The others columns contain instructions for fine tuning the data extraction process. An example of design grid is shown FIG. 3.

Many pages can be processed one after another in a continuous string. The string can be saved under a special user given name as an XML file. It is referred to herein as a surflet because it contains information on surfing one specific site for one specific purpose.

A brief description of the columns in the design grid follows. As shown in FIG. 3, a sample design grid (and playback grid), the grid row number 30 is the actual row number of the HTML element in the design grid, such as HTML element 20 (FIG. 2) This number plays an important role of detecting same business information in spite of possible Web page layout changes when this information is retrieved for playback. FIG. 3 shows a consolidated image of various parts of the same grid in one picture frame.

The HTML Tag Number column 32 is the Source Index of the HTML element from the HTML document. This is a read-only property provided as an attribute of the HTML element. The tag number is useful in identifying the exact element inside an HTML document, and to perform operations like extracting values from that element, or posting some data to that element.

The Tag Type column 34 is the Type attribute given to an HTML element in an HTML document. This attribute is provided to the control type of HTML elements only. The formatting tags like TD, TR, P, etc. do not have a tag type attribute. The Web page controls are TEXT, TEXTAREA, CHOICE, SELECT, RADIO, SUBMIT, RESET and PASSWORD.

The Visible Text column 36 displays the text contained inside every HTML element that is displayed inside design grid 8. The controls on the Web page are displayed with their default text. The TEXT, PASSWORD, TEXTAREA controls are generally kept blank for the user to enter values. The SELECT control 37 usually shows the first item in its list as the default item selected. The RADIO or CHOICE may or may not be selected by default.

The HTML tag specific information is automatically filled in design grid 8 when the grid is displayed. The designer has to supply following information in the appropriate columns against an appropriate HTML tag.

A Web page will change its data content and also possibly its data presentation format between the time a recording is done in the design phase and later played back in the playback phase. At playback time, the user needs to ascertain that he/she is working with the same Web page that was used during the recording of surflet. To achieve this, the user identifies a firm piece of information on the Web page that has a low probability or the least probability of being modified or changed when the Web page data or format is modified. This piece of information will work as a guide during the playback phase, based on which it will decide whether the Web page with is the right Web page or not. This piece of information is called the Page ID data element, shown in column 38. Here, the user selected "Yahoo! Finance" as the Page ID data element since it is very unlikely this information will change at this Web site.

The user thus has to examine the Web page for such stable information (Page ID text), and then click the check box in the Page ID column 38 against the same Page ID text in the design grid 8. There can be more than one such Page ID data element on one Web page. All record time page ID's must remain unchanged (within a tolerance limit as described below) for the playback phase to determine whether the Web page is the correct Web page or not. If a validation is not found on the Page ID data element, the user is notified that the Web page in concern has changed beyond recognition and no further processing is done.

A Base ID data element, contained in Base Column 40, is an HTML data element that acts as a starting reference or base or anchor for other HTML elements during data extraction. The designer identifies one or more such HTML elements which have a high or the highest probability of appearing in the same relative position from the data to be extracted, even if the Web page undergoes modifications.

The design assumes that if the Base ID data element has moved up or down the HTML element hierarchy because of some changes made on the Web page, all the HTML elements associated with data extraction or data submission also will have moved up or down the HTML element hierarchy by the same number.

The Xtract column 42 is of type check box. The check box is clicked if the information contained in the Extraction data element (as seen in the Visible Text Column 36) associated with a check box is to be extracted from the Web site.

The Variable Name column 44 is a user-defined variable name that will contain the extracted business data from the Web browser page. This variable can be supplied to other functions as a variable, or can be set from other applications inside the program to receive input values to be entered on the Web page.

The Forward Tolerance column 46 is a numeric field. The application will go "down" the HTML elements list in the grid within this forward tolerance limit to find a match for the HTML element in consideration. A typical tolerance number is 10, meaning that it is acceptable for the HTML element to wander a little bit here and there as a result of Web page design changes, as long as it is within 10 positions of the recording time position of the same element. The Backward Tolerance column 48 is also a numeric field. The application will go "up" the HTML element tree within this limit to find a match for the HTML element in consideration.

The Xtract All Rows column 50 defines a fixed pattern to be extracted. The designer provides a unique Extract All ID to all the fields that will form the pattern. The number of rows filled in the grid with this unique name form the number of columns in the extraction pattern. This column is useful to define the extraction of data formatted in tabular form. In effect this column is used by the user to specify one complete row of the table to the software. The implied instruction to the software is to Extract All similar rows.

The Stop At column 52 means to stop extracting at certain text. The Extract All Rows pattern looks for the text entered in this field to stop the extraction. If not provided, the end of the document is assumed to be the end of the extraction pattern.

The extracted information is passed from the Web browser to the design grid, and ultimately to the surflet.

Figure 4:
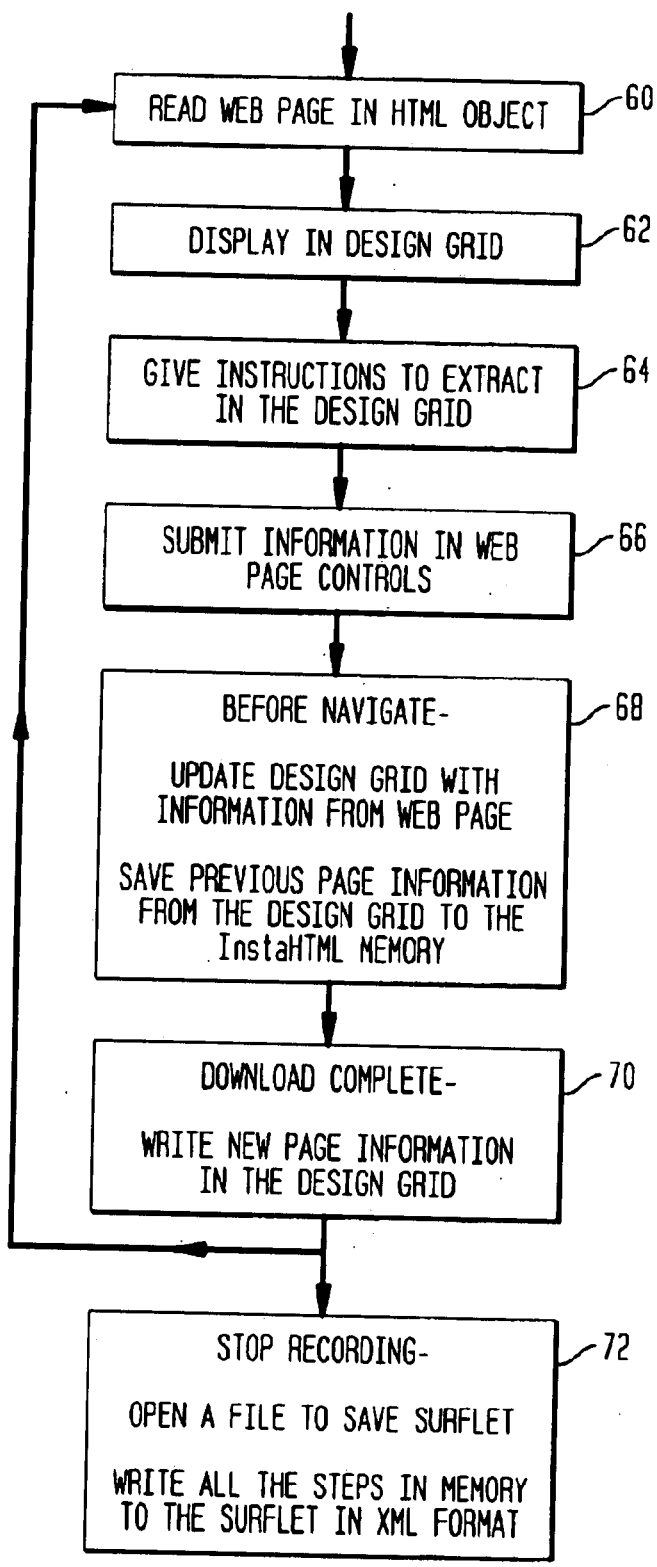
FIG. 4 is a flowchart of the design phase of one embodiment of the present invention.

As shown in the flow chart FIG. 4 (the design phase loop), the Web page is first loaded in the Web browser and is read in the memory at step action 60. The information on this Web page is displayed in the design grid at action 62. The user then submits supporting instructions in the design grid at action 64 and also submits some information on the Web page at step 66. Before the Web page is submitted to the server to receive a new page at action 68, the design grid is resynchronized with the current Web page so that it will contain the most current version of the Web page, and this design grid is saved to the system's memory as one "step". The Web server returns a Web page as a response to earlier request. This new page is displayed in the Web browser and its content is shown in the design grid at action 70. The process continues until the user decides to stop the recording at action 72. When stopped, the steps are saved in the surflet for future playback.

Actions preferably performed by the user are actions 64, 66, 70 and the stop recording action 72. Operations preferably performed by the program include actions 60, 62, 68 and the write action 72.

Figure 5:
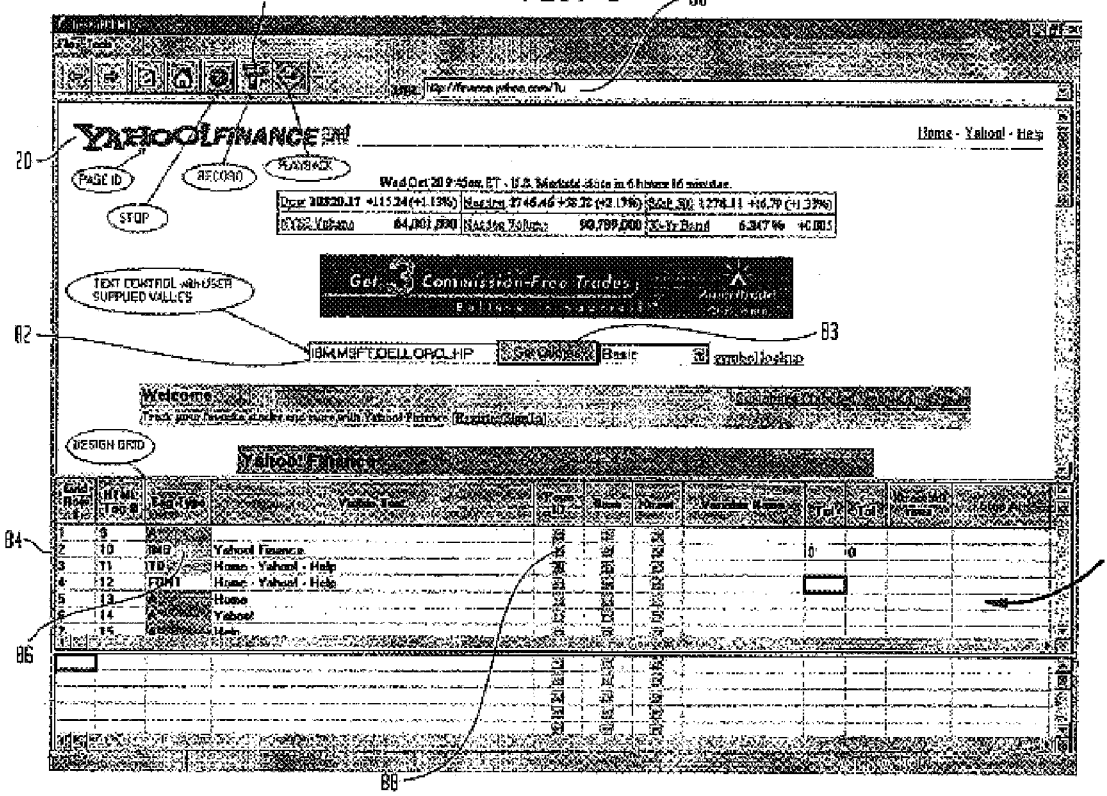
FIG. 5 is a depiction of the user interface showing one Web page of a Web site and the design grid used in accordance with a preferred embodiment of the present invention.

Referring now to FIG. 5, in the design phase, the designer enters the URL in the address box 80 and brings up the design page. Next, the designer clicks the record button 7 to start recording the navigation and extraction process. The click of the Record button 7 populates the design grid 8 with the information contained in the currently loaded Web page in the Web browser.

When the user clicks the Record button 7, the program automatically copies the Web page HTML from the Web browser to a Mshtml.dll document, which automatically makes a list of HTML tags and their names and values available to the program. A utility is preferably provided that can allow or disallow certain tags to be included in the design grid based on the user's preference. Each element in the document is checked whether it is included in the included list. If it is included, it is processed further to include its information in design grid 8.

In the Next step, the designer enters the stock symbols in the Text Control box 82 to get back more information on those stocks. But the designer has not clicked on any buttons or hyperlinks yet.

In this example, the designer believed that whatever changes may take place on the Web page, the image 20 that says "Yahoo Finance" will always appear at the same place. In short, that image will always be there to identify at a later time that this is the correct page that will be automatically visited. Therefore, the designer eyeballs the lines in the design grid 8, locates the line 84 that contains "Yahoo! Finance" in the Visible Text Column and Image "IMG" 86 in the Tag Type column and clicks the check box 88 in the Page ID column. The tolerance given is zero, which means that when this recording is played back, and when this particular Web page is brought up, the program will search for the "Yahoo! Finance" image to be at the exact current location (i.e., grid row number 2, in the design grid). Preferably, no deviation is allowed. In an alternate embodiment, some tolerance can be given to the position of the given element. For instance, if given a tolerance of 20, the program will look for 20 tags above or below the current tag position of "Yahoo!Finance." Such a tolerance can be applied to all elements on the HTML page. If at playback time the program does not find the "Yahoo! Finance" image at that exact position in the list of tags, the program will assume that the Web server has responded with a brand new layout page or error message page and no data can be extracted in such situations until the user re-records the data extraction for the changed page.

In this example, the designer does not wish to extract any data from this first page of recording, and is ready to receive the detailed information on the stock symbols that was entered in the text control. Therefore, the designer clicks the Submit Button 83 ("Get Quotes") on the Web browser.

As explained above, some information (stock symbols) was entered in the Web browser after that page information was displayed in the design grid. Therefore, the grid needs to be updated with the information on operations performed on the Web page in the Web browser, including the click of the submit button, before the Web page is sent back to the Web server. This update of design grid is necessary because after the update, the grid will carry entire information that is self-sufficient to reproduce this recording in its entirety.

Before the Web page is submitted to the Web server for a response, an event in the Web browser called BeforeNavigate is always triggered automatically. This allows the program a chance to extract the relevant information from the current page before it is sent back to the server. The program inspects the status of every tag in the MSHTML tag list and all tags that were used by the user as Page ID, Base ID Extract, Extract All or were clicked on in the browser window are saved to a memory structure.

Figure 6:
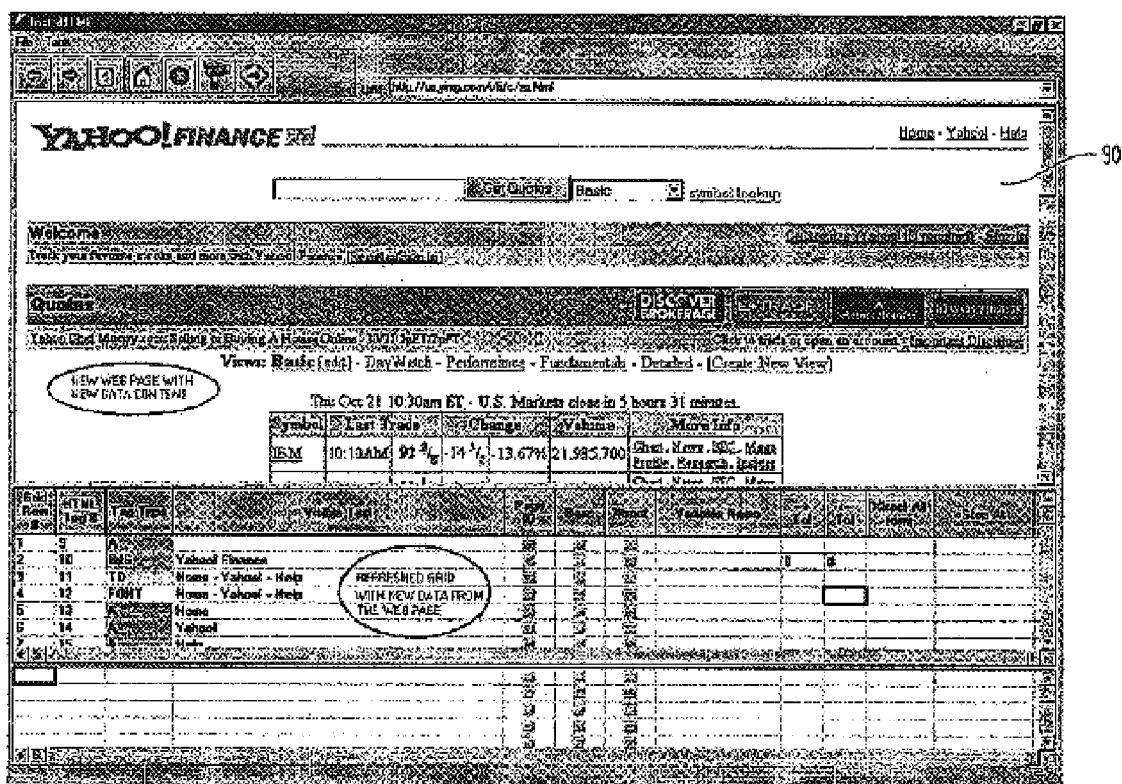
FIG. 6 is a depiction of the user interface showing a Web page and design grid with a refreshed grid with new data from the Web page.

When the Web server sends a response back to the client browser, an event in the Web browser called Document Complete indicates to the program that all data has been received, and the program updates the Design Grid with the information contained in this newly-loaded Web page 90 as shown in FIG. 6.

Figure 7:
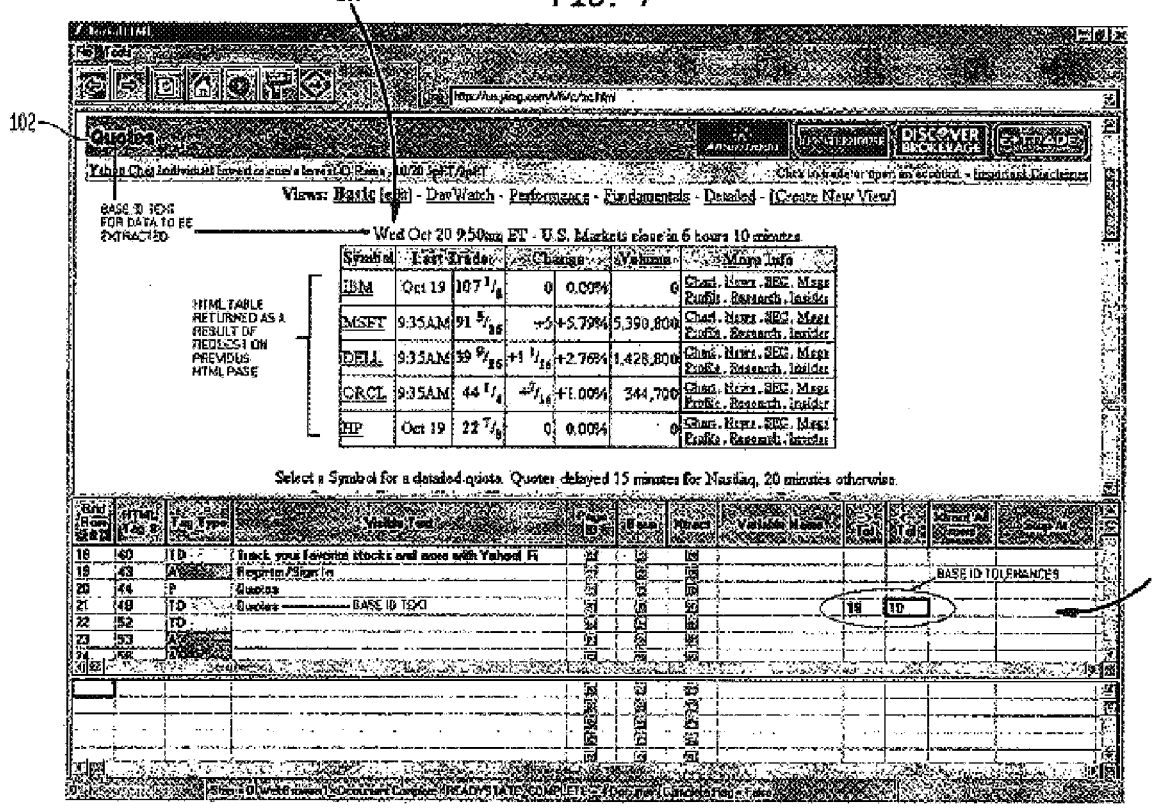
FIG. 7 is a depiction of the user interface showing a second Web page containing HTML data and showing the design grid and the selection of the Base ID data element.

This second Web page 90 has data of interest to the designer who wishes to extract it. As shown in FIG. 7, the table 8 in Web browser displays the information returned as a result of user request in the first step. The designer wants to extract the information on the date and time of the stock information on this page, shown at element 100. This is an isolated data extraction. This information can move up or down within the Web page later on. But there are certain key information pieces on every Web page that always appear on that page, albeit their position in the layout of the Web page may have changed a bit. These, are referred to herein as the Base ID elements. These Base ID elements act as an anchor with whose reference other data can be extracted. In FIG. 7, the Quotes text 102 has been assigned the role of a Base ID element. The tolerance provided is 10, both for backward and forward tolerances. This ensures that during the playback of this recording, if this second Web page has changed within the provided tolerance for the specified Base ID element, the Base element still will be located from the Web page in the playback.

Figure 8:
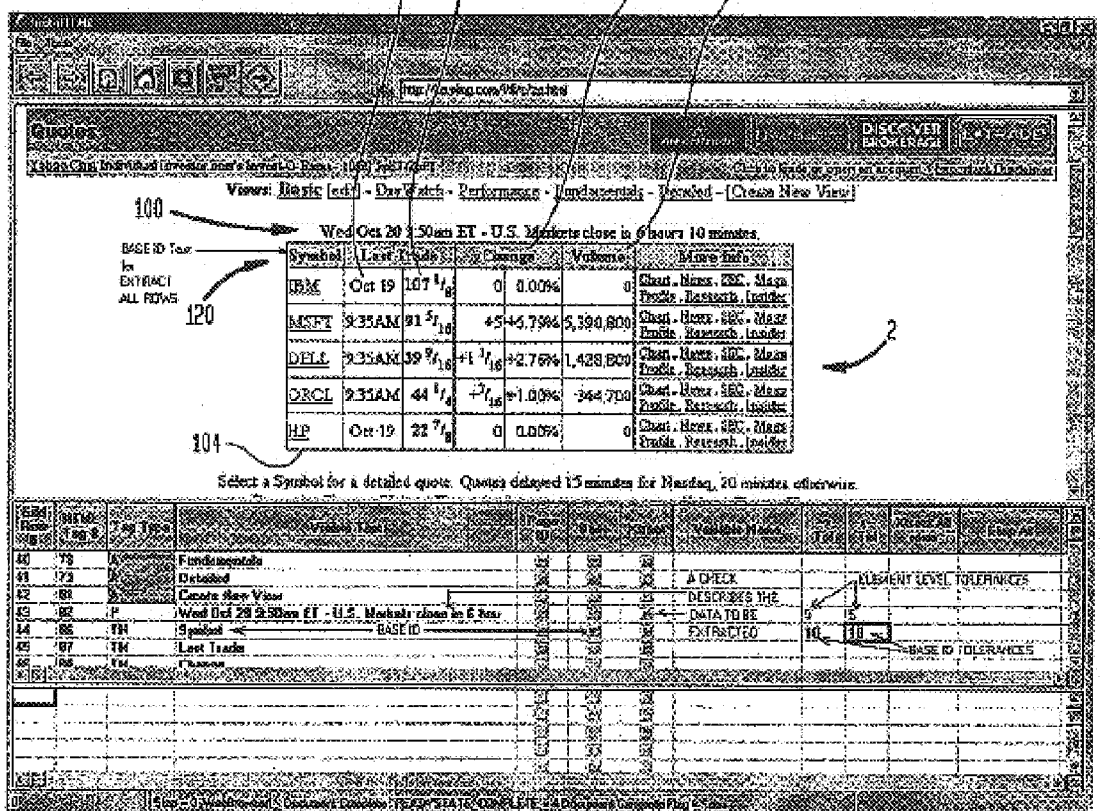
FIG. 8 is a depiction of the user interface showing a second Web page containing HTML data and showing selection of an Extraction element including the data to be extracted from the Web page.

As shown in FIG. 8, the designer wants to extract the date and time 100 of the stock values returned on the Web page. The designer also has provided a backward and a forward tolerance of 5. This means that during the playback of this recording, if the given text has moved within the provided tolerance, it still will be identified and retrieved.

The designer also wishes to extract the information contained in the table 2, i.e., the stock name 104, the stock value 106, the date and time 108, the percent change 110, and the volume traded 112. The designer identified the column header Symbol 120 as the Base ID element for this second data extraction, and has provided a value of 10 for the backward and forward tolerance.

This Base ID element will act as an anchor to the "Extract All" data extraction from the table.

Figure 9:
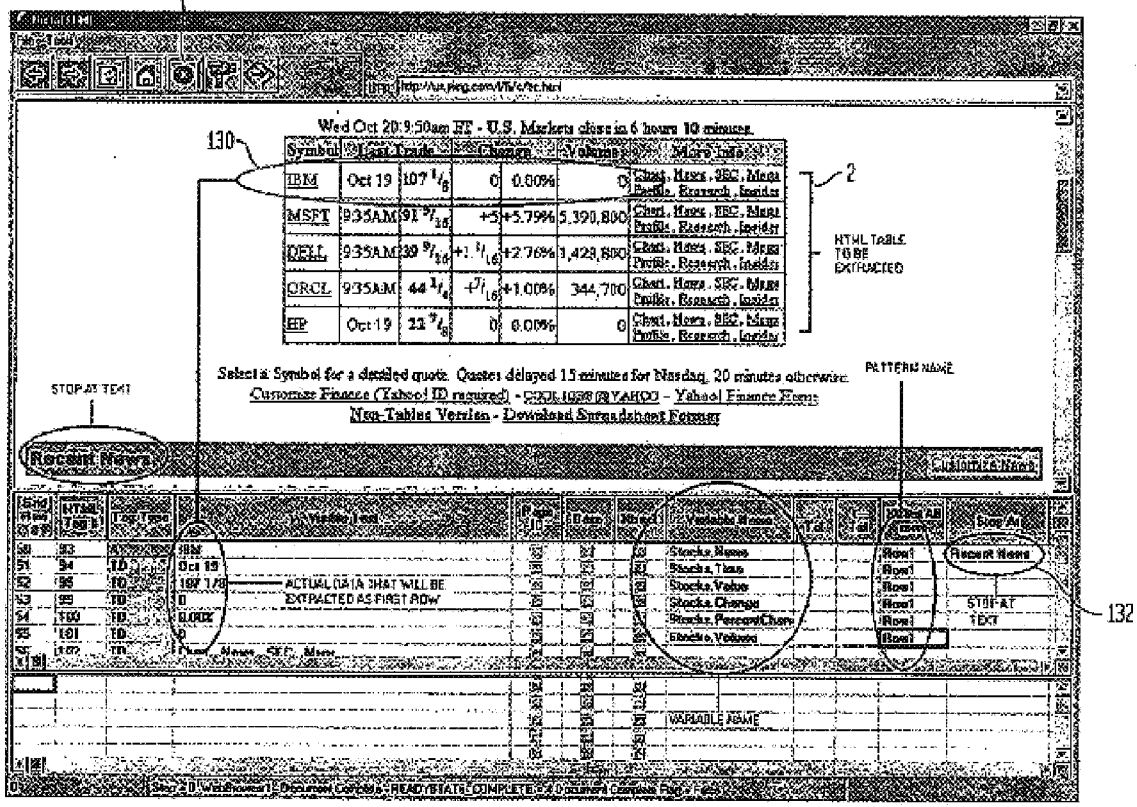
FIG. 9 is a depiction of the user interface showing a second Web page containing HTML data and showing user specified variable names and extraction patterns of the data to be extracted.

The designer next has to provide a sample of the pattern that user wants to extract. As shown in FIG. 9, the first row 130 of the table 2 serves as the sample. In the design grid, the designer provides a user-friendly name to the data that will be extracted in the Variable Name column, and also a user chosen name to this pattern of data extraction ("Row 1" in this example).

The program also needs to understand at what point it should stop extracting data in an Extract All type of extraction. Therefore, some text is provided where the extraction will stop. The text "Recent News" 132 is used as a relatively firm piece of information that should always appear on this particular Web page. Hence it is selected. Now when the Extract All extraction is implemented, it will extract the first row from the table, look to see if it has reached an element that has a text called "Recent News". If not, the program will continue to extract until it finds that text. Thus, the program will extract data from all the desired rows from the table on the Web page.

This process is repeated until the designer decides to stop the recording by clicking the stop button 134. The designer is provided with an option to save the current recording in a surflet file. Once saved, this file can be reloaded any time, as many times as desired for playback.

Figure 10:
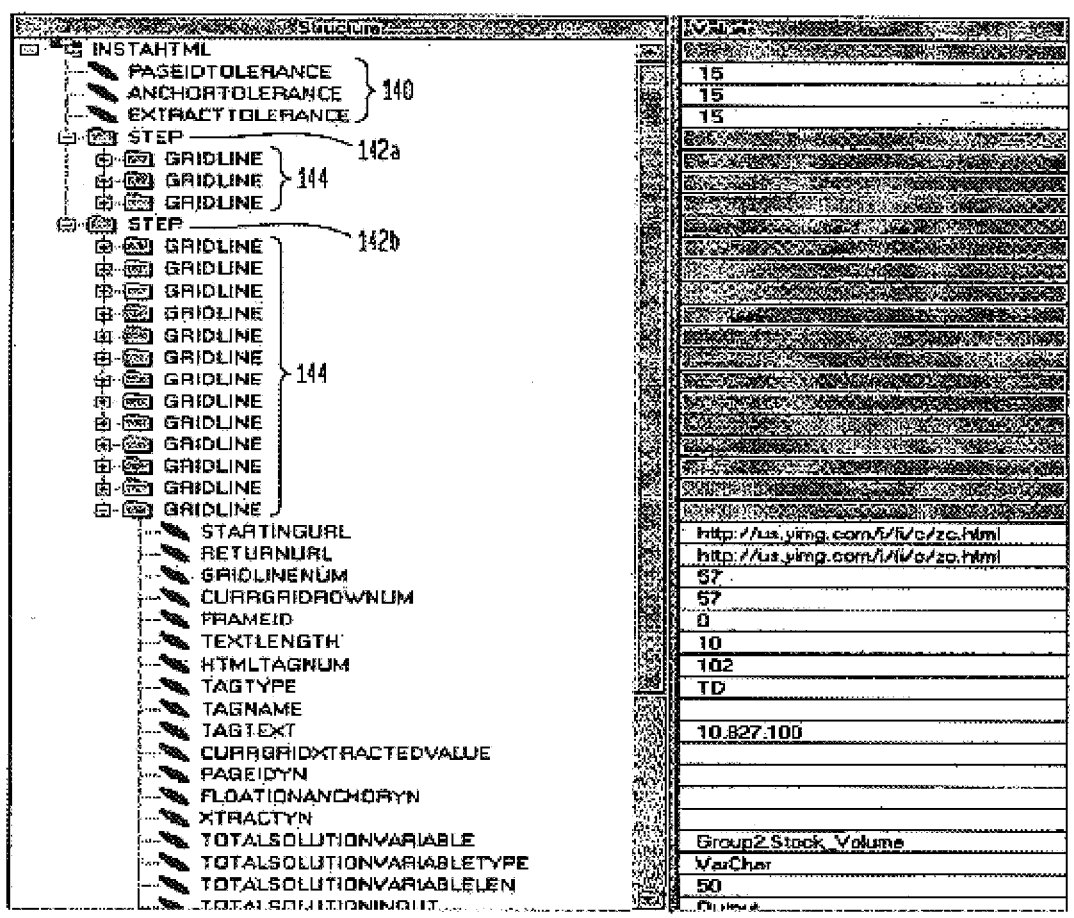
FIG. 10 is a depiction of a schema file storing information recorded during the design phase of one embodiment of the present invention.

The schema file is a representation of the steps that were recorded. As can be seen in FIG. 10, there are some Global variables 140, two folders 142a and 142b called Step, and many subfolders 144 called Gridline within those folders.

The variables "PageIDTolerance", "AnchorTolerance", and "ExtractTolerance" are applicable to the whole schema, i.e., to all steps. They decide default tolerances, saving the user the work of specifying tolerances on every row. The folder Step corresponds to one step in the recording. That means the file in FIG. 10 has only two steps, which in turn means that only two steps were recorded in the design phase. The folders, Gridline 144 under each step folder represents one row in the design grid. Each gridline folder has numerous variable fields, which represent one column each in the design grid. The value of the variable is the value in that row of the associated column of the design grid.

Figure 11:
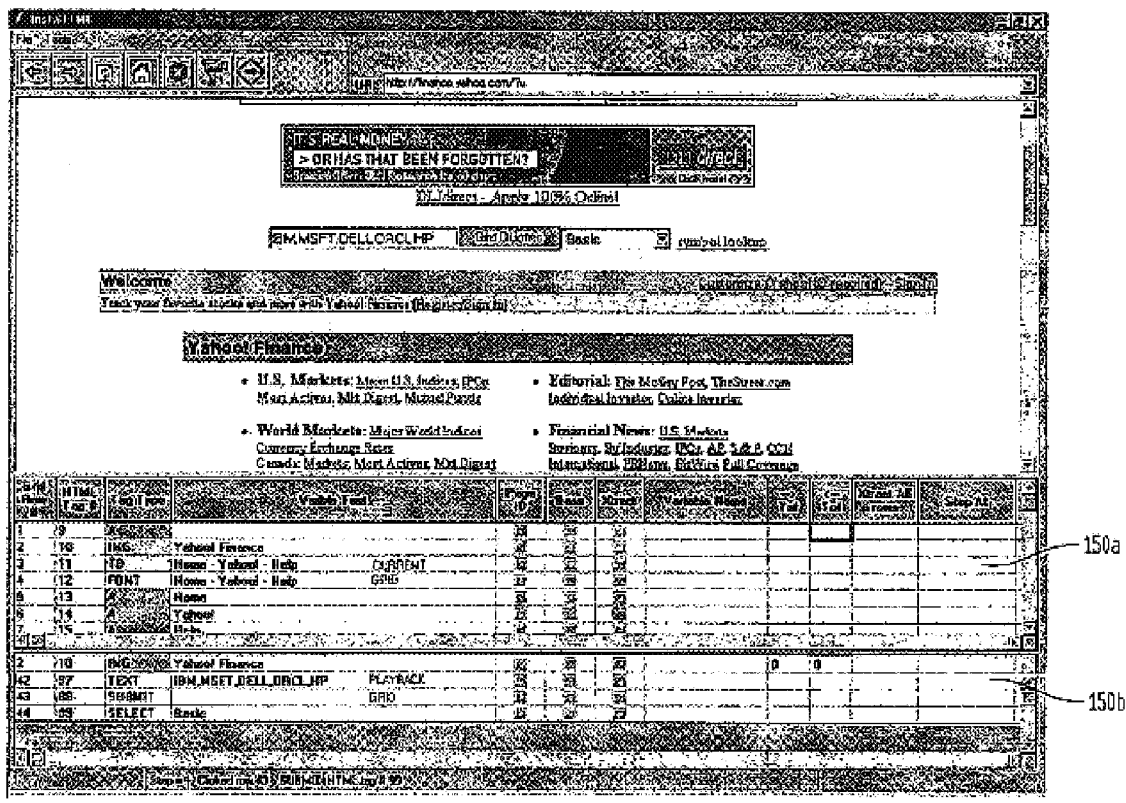
FIG. 11 is a depiction of the user interface showing a Web page and the current grid and playback grids.

The current grid is same as the design grid in its layout. This grid is populated during the playback of a recorded surflet only. It always displays the content of the current Web page loaded in this embodiment's Web browser. An example of current grid is shown in FIG. 11. The upper grid 150a of the two grids seen is the current grid. The playback grid 150b is same as the current grid 150a in its layout. This grid is populated during the playback of a recorded surflet only. It displays only those rows that were saved as a step during the design phase.

Figure 12:
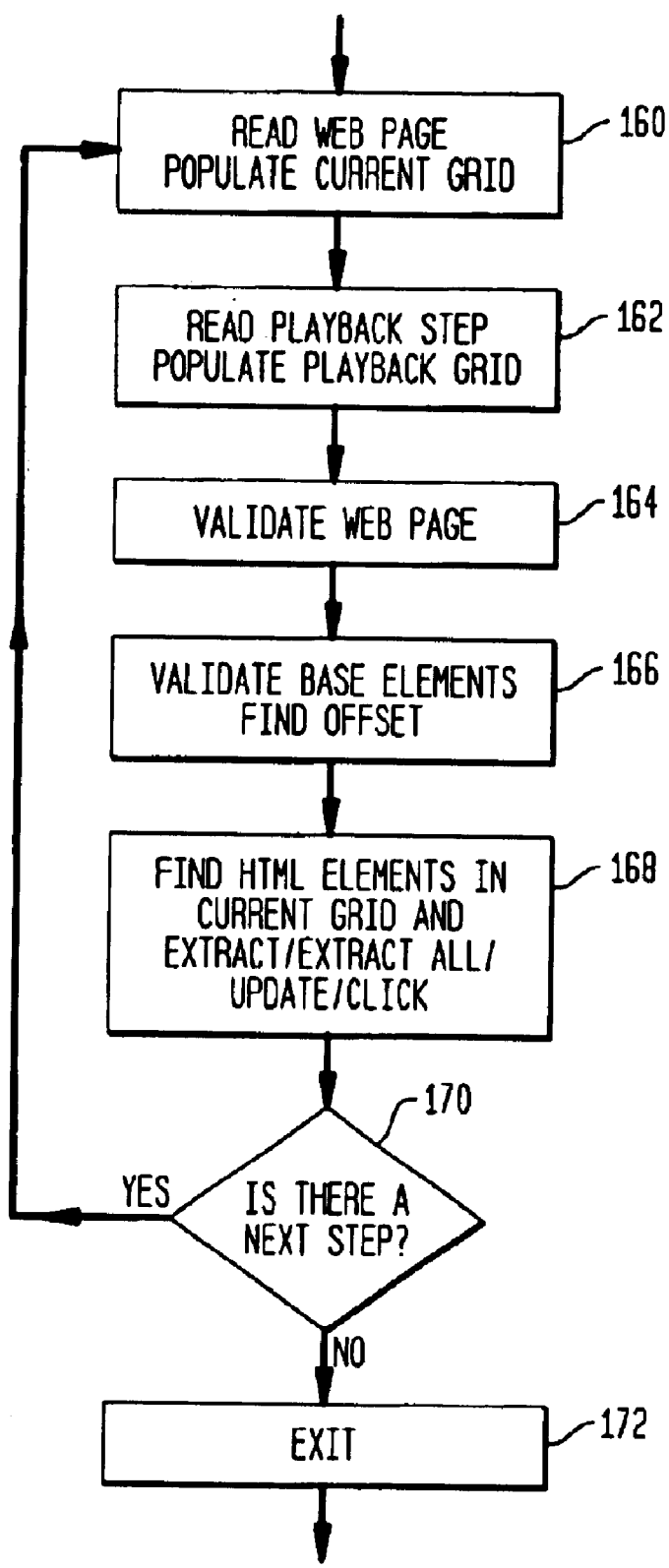
FIG. 12 is a flow chart of the playback phase of one embodiment of the present invention.

FIG. 12 shows the playback loop flow diagram. The playback starts when the playback button is clicked. Before the actual playback starts, the Web browser should show the same starting Web page from where the playback was recorded earlier.

The first action in the playback is the reading of information from the surflet XML file identified by the user in a file open dialog box. The information in the surflet file is saved during the design phase in such a way that there are as many of XML nodes as that of the steps. Each row in the design grid for a step is again a separate sub-node to the step node in the surflet file (FIG. 10). Thereafter, the memory structure is filled with information from the surflet file in a similar hierarchical fashion.

As a starting step, the user or a program navigates to the Web page in the design step from where the recording began. The user clicks the record button, and, in action 160, the current grid is populated with the starting Web page, whereas the playback grid, in action 162 is populated with the previously saved grid information from the memory. Then, validation action 164 is performed where it is ascertained whether the currently loaded Web page is the Web page that the user wants to work with. A check is made based on the identification marks made in the playback grid. At action 166, similar validations are made for elements identified as Base ID. Then, at action 168, each HTML element in the playback grid is searched in the current grid based on the grid row number, tag type, and tag text. After it has been located, appropriate action is performed (like Extract, Extract All, Update Web page) based upon the information in the playback grid for that element. A click on the current browser is simulated to submit current information to the Web browser. This completes one step of the playback loop. When the Web server returns a Web page back, its content is loaded in the current grid. At action 170, the next step from the memory is loaded in the playback grid, and the process continues until all the steps in the memory have been encountered at which the loop is exited at step 172.

Figure 13:
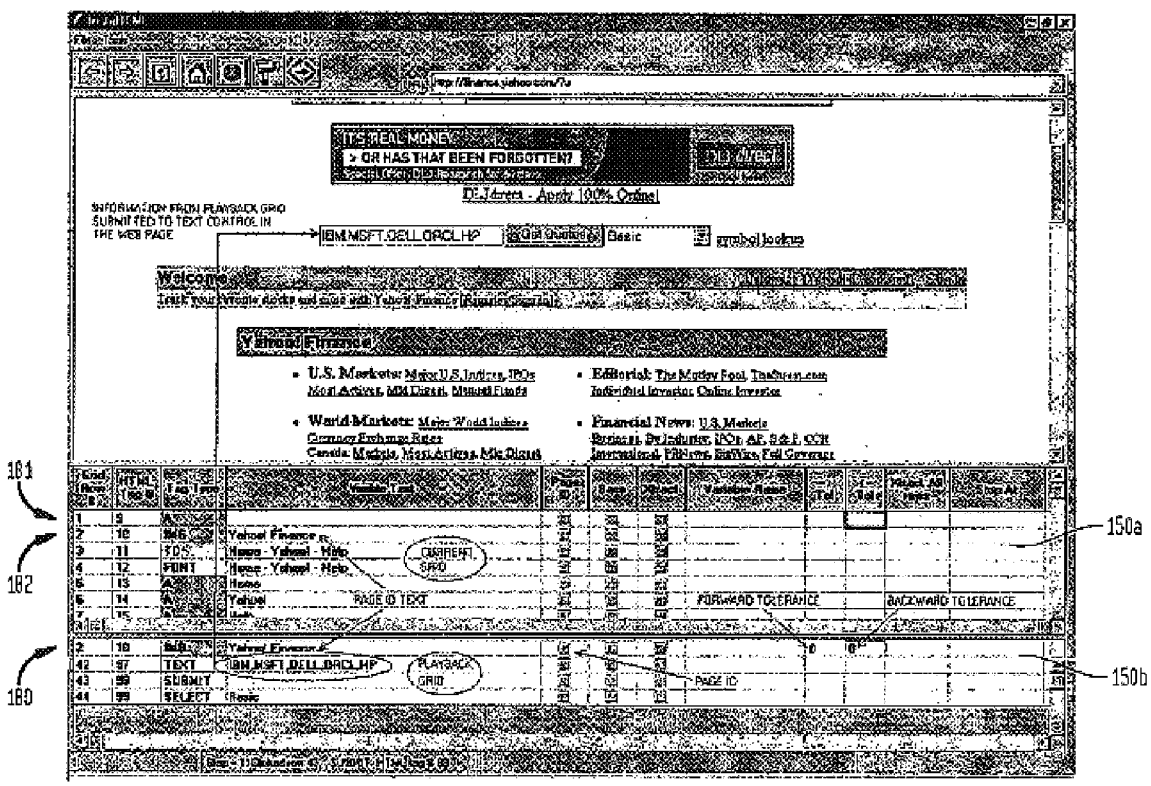
FIG. 13 is a depiction of the user interface showing the current and playback grids and the information from the playback grid submitted to the Web page.

In action 160, the current grid 150a is filled with information from the Web page in the Web browser in view (FIG. 13). Next, at action 162, the information about the first step from the memory is displayed in the playback grid 150b. Next, in the validate Web page step 164 the rows from the playback grid are picked up one by one in a loop to find out if any of the rows have HTML elements that have been defined as a Page ID element. When such row is identified, an attempt is made to find the same HTML element in the current grid 150a.

In this example, there are four rows in the playback grid. These rows were saved during the first step of the design schema. The first row 180 was identified to be a page marker at that time. The information associated with this row is as follows:

| Grid Row Number: 2: | |
| --- | --- |
| HTML Tag Number: | 10 |
| Tag Type: | IMG (Image) |
| Visible Text: | "Yahoo! Finance" |

-continued

| Grid Row Number: 2: | |
|---|---|
| Forward Tolerance: | 0 |
| Backward Tolerance: | 0 |
| Page ID: | YES (checked) |

The information about this row is saved in memory when it starts to search the exact element in the current grid 150*a*. In the example, the first row 181 in current grid is checked against this saved information from the playback grid and does not match. The program then moves on to the next row 182 in the current grid, which has the following information describing itself:

| Grid Row Number: | 2 |
|---|---|
| HTML Tag Number: | 10 |
| Tag Type: | IMG (Image) |
| Visible Text: | "Yahoo! Finance" |

The grid row number from the playback grid matches exactly to the grid row number of the current grid for the tag type, and visible text. Therefore the tolerances of zero will work here, and there will be a match on the grids. As a result, the program knows that it is dealing with the same and correct Web page that was used during the design phase.

If the image (Yahoo! Finance) had moved between the time of recording and playback, its grid line number and HTML tag number would have changed in the current grid. In that case, the program would have applied the backward and forward tolerances to find a match.

The forward and backward tolerances operate as a guide that tell the program how much up or down in the grid it should look to find a possible match. In the current example, if the rows in the playback phase had not matched, the program would have had to search the current grid to find a possible match. If the forward tolerance was 5, then from the location in the current grid where the program originally expected to find a match (row 2 in current grid), the program moves down the current grid one row at a time. The software compares the Visible Text and Tag Type of that row to the saved information of the row declared as Page ID in the playback grid. If a match is found in the third move, then the program knows that the Web page has changed since the last recording, but within the tolerance limit provided. Hence, the program proclaims that a match is found, albeit with some adjustment.

The adjustment, which will be 3 rows movement in the example, is called an offset of that element. This means that any subsequent HTML element present is the playback grid is also expected to appear 3 rows below its originally expected position in the current grid.

As described above, a Base ID element is a reference ID of an element for other elements. The presence (though not the exact location) of this element on the Web page is more or less assured, and hence it serves as a good anchor (or base) to locate other information from the same page. The Base ID element itself can move between the design time and playback time. In such case, the backward or forward tolerance is applied to find out the correct new location of the element tag that had been declared as a Base ID element in the design phase. When the match is found, the offset is determined, which is the difference between the old and the new row number of the Base ID element. All the elements associated with this Base ID element are identified further based on the offset calculated from the new position of the Base ID element.

Figure 14:
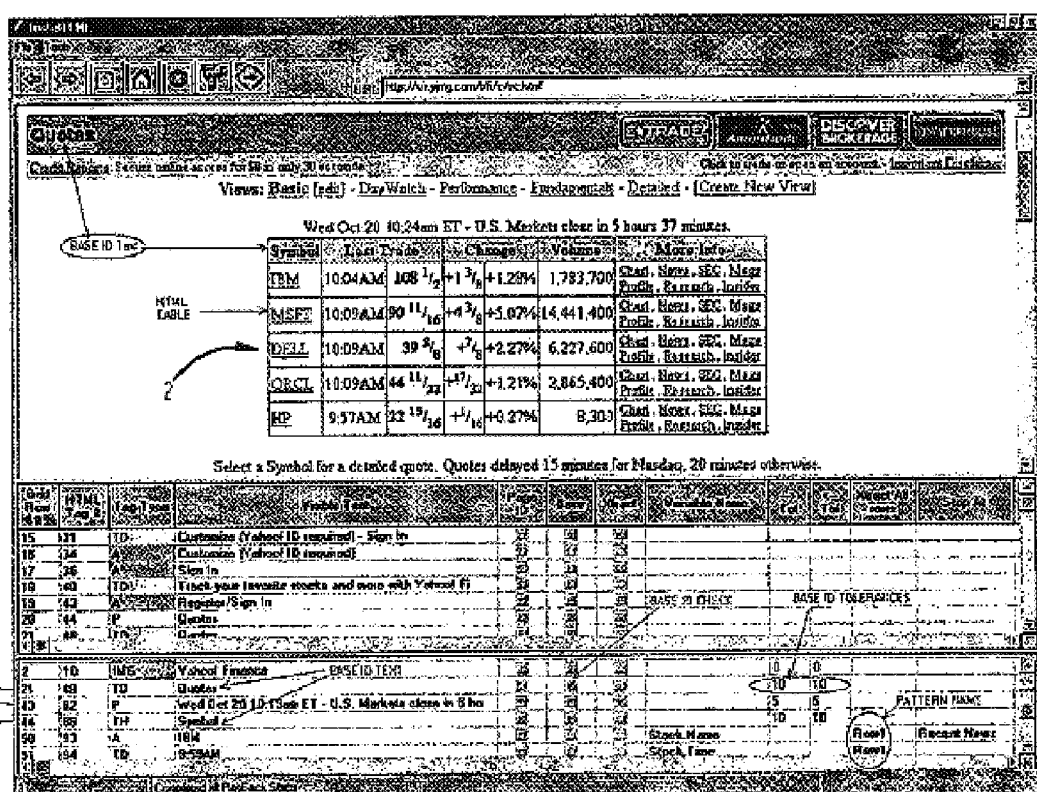
FIG. 14 is a depiction of the user interface showing a second Web page and current and playback grids associated with a second Web page.

In this example, as shown in FIG. 14, there are two Base ID elements 191 and 192, one for the stand-alone extraction, the other for the column data extraction. If there is more than one Base ID element, then the elements that lay between the two successive Base ID are associated with the Base ID element which appears earlier in the playback grid.

Action 166 is essentially the repeat of action 164. The difference is that the offset found in action 164 is added to the row number from the playback grid, and then the match is performed on the current grid. This method takes care of any rippling effect the base element has on the other elements because of its relative displacement in the new Web page. In addition, each element may be assigned a forward and/or backward tolerance. This further helps to cushion changes made to the HTML page since the design was recorded.

For example, in FIG. 14, the third row 193 in the playback grid has instructions to extract some information from the Web page. This row has the following information:

| Grid Row Number: | 43 |
|---|---|
| HTML Tag Number: | 82 |
| Tag Type: | P (Paragraph) |
| Visible Text: | Wed Oct 20 10:24am ET - US Markets closes in 5 hours 37 minutes. |
| Forward Tolerance: | 5 |
| Backward Tolerance: | 5 |
| Xtract: | YES |

The Base ID appearing before this extract is the Base ID with text as Quotes in row 190. This row has the following information:

| Grid Row Number: | 21 |
|---|---|
| HTML Tag Number: | 48 |
| Tag Type: | TD |
| Visible Text: | Quotes |
| Forward Tolerance: | 10 |
| Backward Tolerance: | 10 |
| Base ID: | YES |

The program validated the Base ID element before it reached this extraction. This Base ID has a tolerance of 10 units. Suppose the Web page changed from the time the user created this surflet, and some information was added before the text Quotes. Also, some text was added between the text Quotes and the data to be extracted (i.e., "Wed Oct 20 10:24 am ET—US Markets closes in 5 hours 37 minutes"). Let the new row number for the text (Quotes) in the current grid be 29 (instead of 21), and the new row number for the element of interest for data extraction be 52 (instead of 43).

Therefore, the offset for the Base ID element will be 29−21=8. The difference (8) is still within the tolerance limit declared for the Base ID (10). Therefore, this Base ID will be located in the current grid in row number 29, and will be validated. The offset of 8 tells the program that all other HTML elements appearing after this Base ID element would also have moved down the hierarchy by at least 8 values.

To identify the element to be extracted in the current grid, the program takes the row number of that element from the playback grid (43) and applies the offset to that value. Here, it would be 43+8=51. The program looks up the current grid at row number 51 for the exact text that is present in the playback grid. But the data of interest also has moved down because of some changes made to the Web page, and its new location in the current grid is 52. Therefore, the program applies the forward tolerance (of 5) and correctly locates the target at row number 52.

Now the row number of the element is correctly located in the current grid. The HTML tag number associated with this row is the actual Source Index of that HTML element in the changed HTML page. The handle on the HTML element's source index allows the program to programmatically manipulate that element as instructed.

The tolerances on Base ID, and the element itself helps to cushion the changes made to the Web page after it was used for creating a surflet. This method assures that given the right instructions, the program will find the correct HTML element from a given Web page.

At action 168, after the element has been correctly identified, the methods like inner-text, outer-text are invoked to extract the information contained inside that element. Extract can be a single extract, or can be an Extract All type to be extracted. When an instruction to extract is in isolation, meaning no other element's information to be extracted along with the one in focus, is it single extraction.

Sometimes, however, data is presented in HTML tables. The idea is to define a pattern of extraction for the first row, and then the program will extract the remaining rows based on the outlined extraction pattern. To achieve this, the following supporting information is required: Variable Name; a unique name to hold the extracted value; Xtract All command; the name given to an extraction pattern of Extract All type (there can be more than one pattern names per playback step) ; and the Stop At text.

The Stop At text is the text of the element that tells the program where to stop extracting during a pattern search and extract in Extract All type of extraction. The Stop At elements position adjusts the offset for all further extractions on that page. This allows for data appearing after varying length tables to be correctly extracted, regardless of how many rows existed in the table at design time and at actual run time.

In the example (FIG. 14), the first row of the table 2 has been identified as a pattern for extraction. The program knows the number of rows in a given pattern because of the same name given against the HTML elements in the playback grid that form the pattern (Row 1). In the example, there are five elements in the pattern. The pattern is read in memory from the playback grid. Each element from the memory is read one at a time, and a match is found in the current grid as described in earlier occasions. Likewise, all the elements in the memory are matched. At the end of which a check is made if the text given in the Stop At column has reached or not. If not, the first element from the memory collection is read again and a match is searched in the next element in the current grid. Similarly the other elements also are applied for a match until the text in Stop At column is reached. As a result, the extraction logic keeps applying the pattern given in playback grid (identified by Row 1) to the rows in the current grid table until it encounters the "Recent News" text. This results in retrieval of all the rows in the Web page table.

The information entered by the user during the design phase in the HTML controls is saved in the surflet, and is reproduced again in the playback phase in the playback grid. The next step is to identify the input controls in the playback grid and update the appropriate Web page controls with information in the playback grid row. This programmatically simulates the user's action of typing information on the HTML page. The same method of HTML element control identification is employed as in actions 164 and 165. After the element is identified, depending on its type, the text is set inside the control, or the index is set if it is a multi item control (e.g., radio button, choice, select, etc.).

In the current example, the symbols for the stocks were updated accordingly in the text control on the Web page.

In the design stage, when the user clicks an HTML element, the information on that clicked element is saved in the surflet. This information is reproduced in the playback grid. The same logic of element validation with/without offset is applied to find out the new position of the same HTML element in the current grid. Thereafter, this element is programmatically clicked by invoking the click method on the HTML element. This prepares the document to be submitted to the Web server with the user-entered information.

This completes one step in the series of playback steps where one submit and one extract is done simultaneously. The HTML page is submitted to the server, and a response is returned. This new page is again loaded in the current grid. The next step from the memory structure is read and displayed in the playback grid.

In another preferred embodiment of the present invention, a system and method is provided for data extraction from XML data, including a method for capturing, filtering and converting XML data into more conventional tabular (relational) table formats, using an easy point and click user interface. The data can be from the Internet, Intranets or flat files on local drives or LANS/WANS. The program captures the live data from the XML source and converts the data in a relational (tabular) format. The new format can then be used by anyone needing filtered original data in the more conventional relational format.

This embodiment preferably provides a user-interface providing point and click user interaction to: identify an XML data source; identify the XML data of interest within the data source; save these instructions for later use; automatically retrieve live XML data at a later point in time using the saved instructions; and automatically filter the live data to cull it down to data of interest. Automatic conversion of filtered live data into more conventional table formats for easier use of the data by applying well known SQL techniques A preferred aspect of this embodiment executes in two modes, the design mode and the playback mode. The design mode allows a person (referred to as the "Designer") to instruct the program which and how much data is to be captured from a Web site (or a file) capable of supplying XML data. The program saves these instructions in a file, referred to herein as a "schema" file. The schema file itself is preferably an internal XML file but is not directly related to the XML data being captured.

The playback mode can be monitored by a person for testing purposes or can be completely automatic, devoid of human interaction, for program to program communication purposes. It reads the saved instructions from the schema file and gets selective live XML data from the source (Internet, Intranet or file) and converts it in a relational (tabular) format. The new format can then be used by anyone used to using conventional data.

With this aspect of the present invention, a design mode and a playback mode are again preferably used. The design mode essentially is a teach mode, wherein the set of instructions taught by the designer is saved in as a schema in a XML file.

Figure 15:
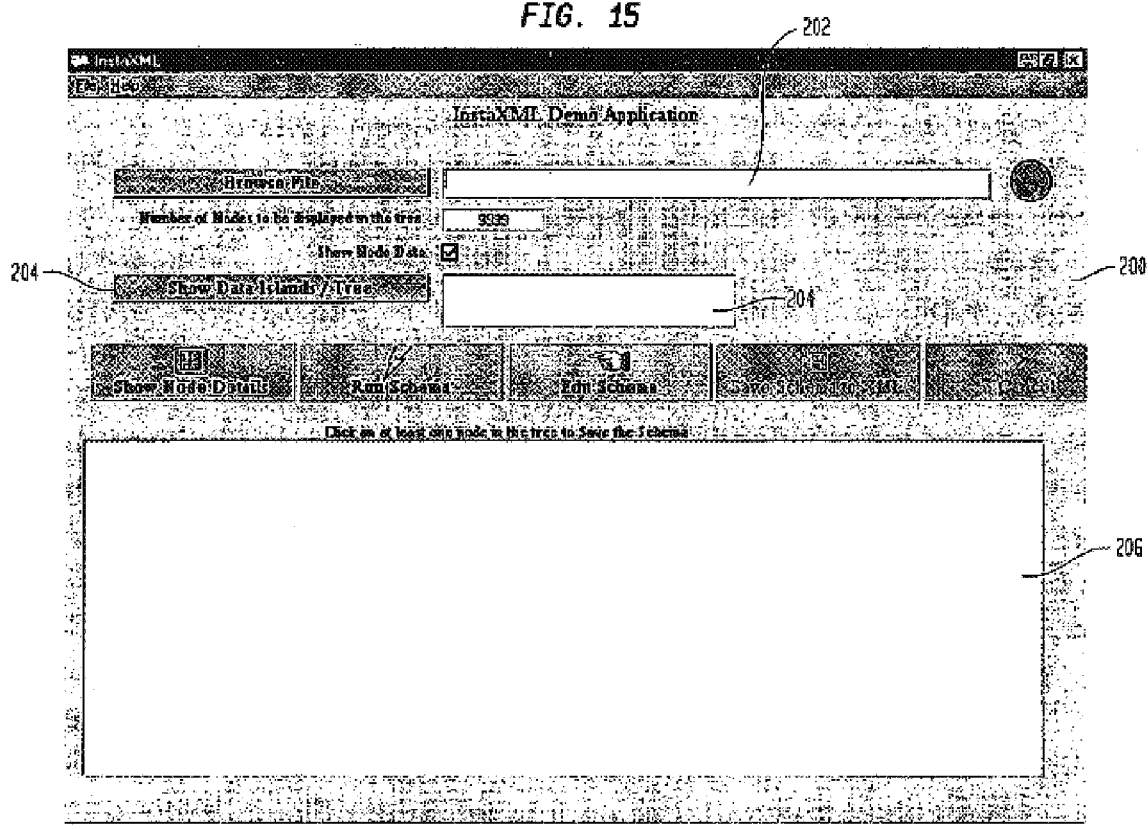
FIG. 15 is a depiction of a program user interface used in connection with automated browsing of XML data Web sites in accordance with another embodiment of the present invention.

When the program is started in design mode, the screen 200 shown in FIG. 15 is presented as the user interface. The designer identifies the data source from where the XML data is to be captured at playback time by typing in a Web address or choosing a file in field 202. The designer then clicks on the Show Data Islands/Tree button 204. At this point, the program navigates to that Web site or opens the file, loads the XML contents of the source in the MSXML.DLL offered by Microsoft utility as a document object. Further processing takes place in the document object.

The document can be of two main types. It may either be an HTML Web page with embedded XML "data islands" or it may be a standalone XML file.

Figure 16A:
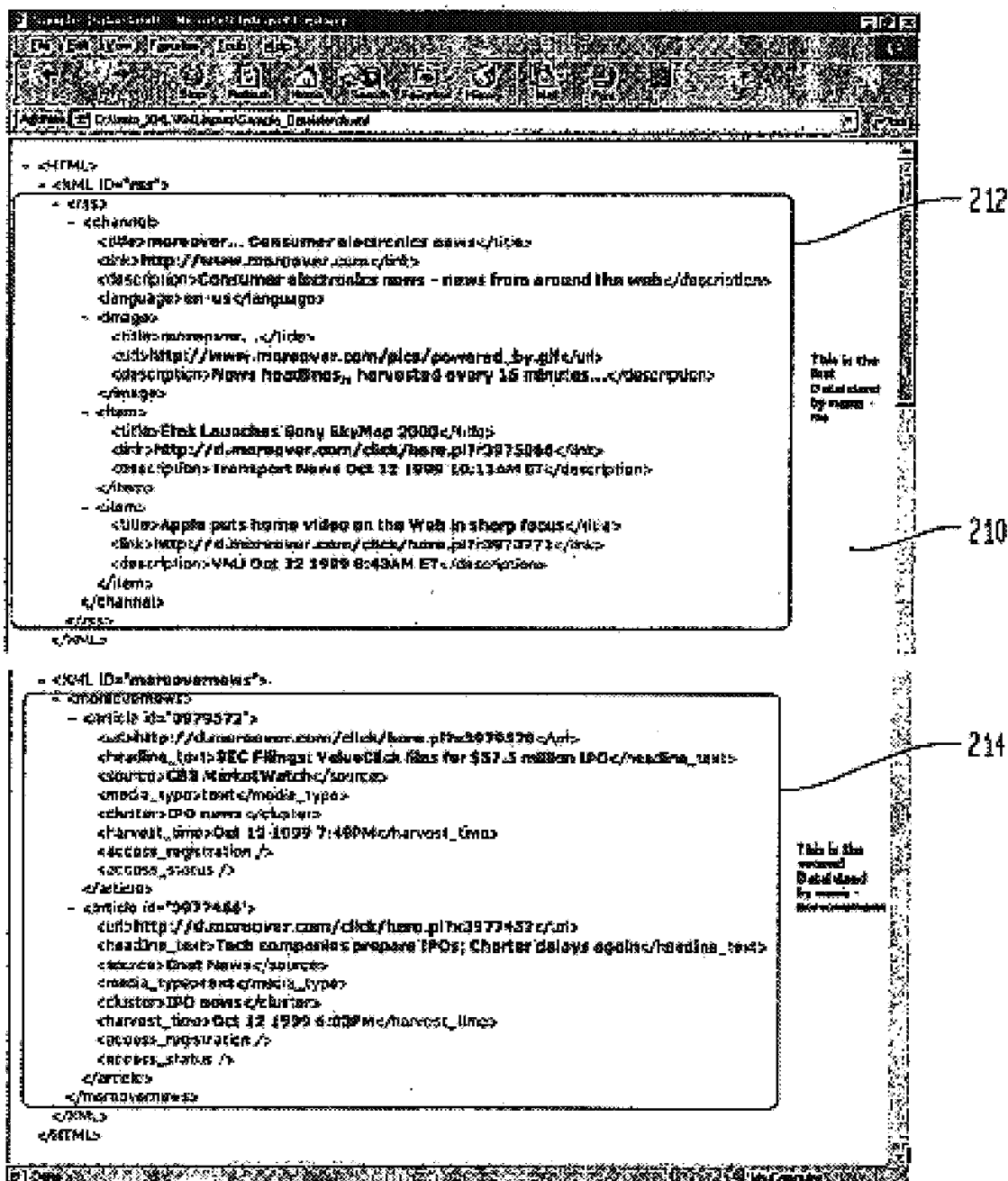
FIG. 16A is a depiction of XML data islands extracted from a Web page containing embedded XML data islands.
Figure 16B:
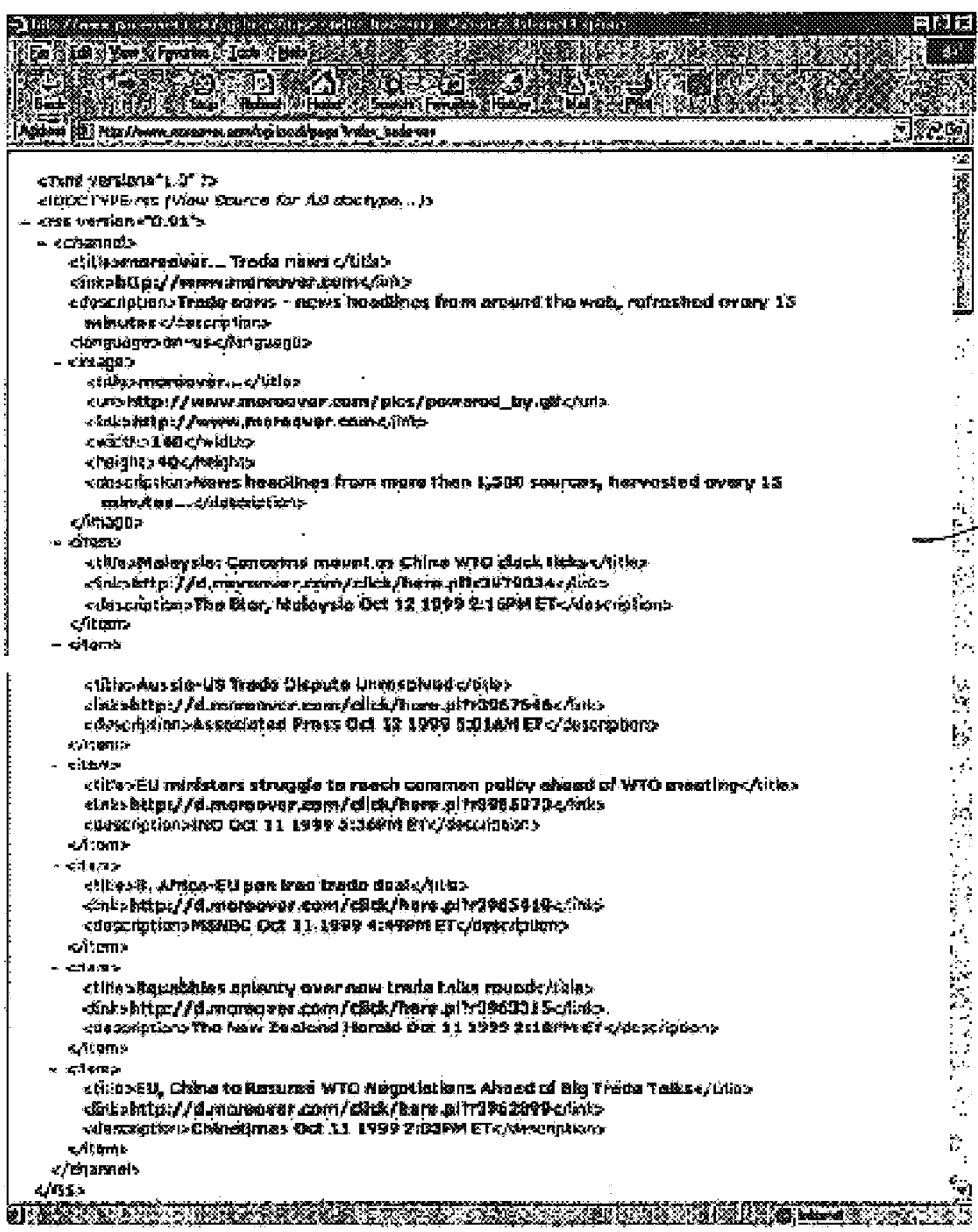
FIG. 16B is a depiction of XML data islands extracted from a XML file containing embedded XML data islands.

An example an HTML Web page 210 with data islands 212 and 214 with is shown below in FIG. 16A. An example of a stand-alone XML file 220 is shown in FIG. 16B.

Figure 17:
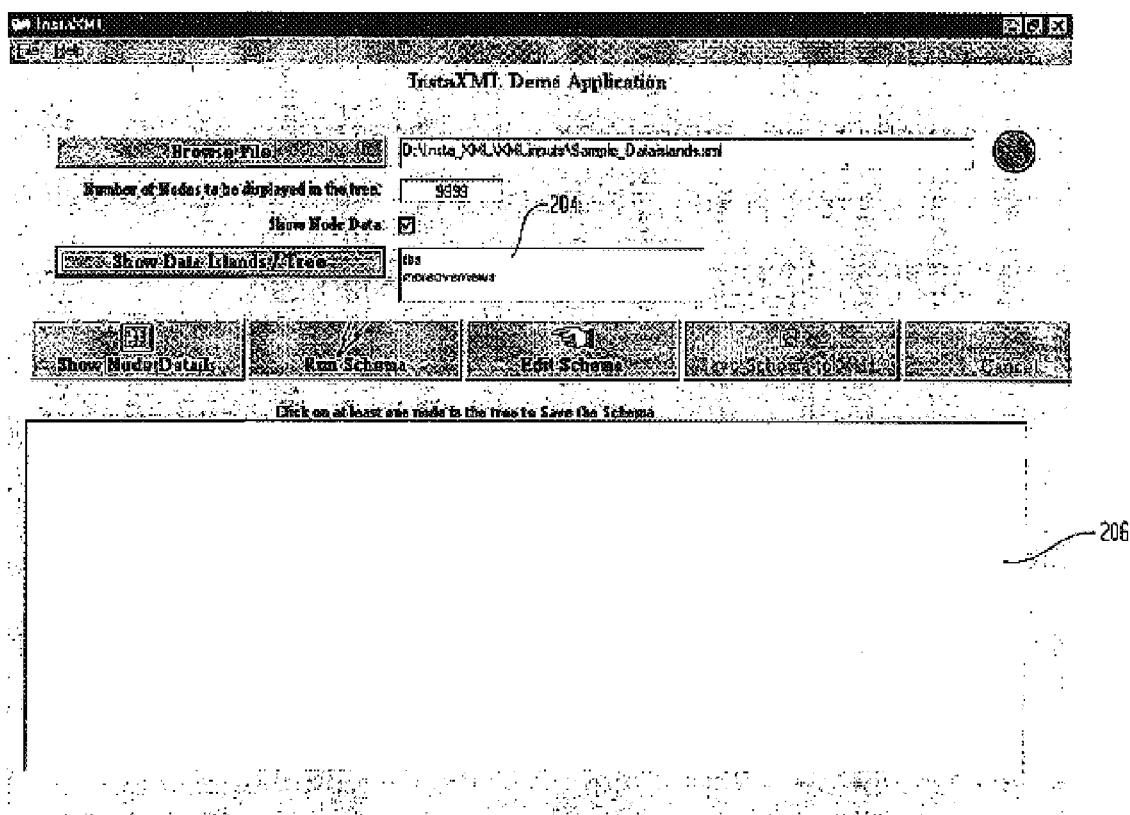
FIG. 17 is a depiction of the user interface showing an XML file and data islands associated with the file.

When the designer presses the Show Data Island/Tree button 204, if the XML data source contains data islands, a list of those islands is shown in the data islands list box 204. As shown in FIG. 17, the user chooses one data island (here the data islands are "rss" or "moreovernews") for further data extraction definition by clicking on it in box 204.

If the XML source contains only XML data (i.e. without any data islands) then that entire XML is shown in box 206 (shown in FIG. 18) directly, skipping the steps of requiring the user to identify the particular data island. All further processing is the same regardless of whether the data in lower box 206 was loaded from a XML file or from a XML data island embedded inside another file.

Figure 18:
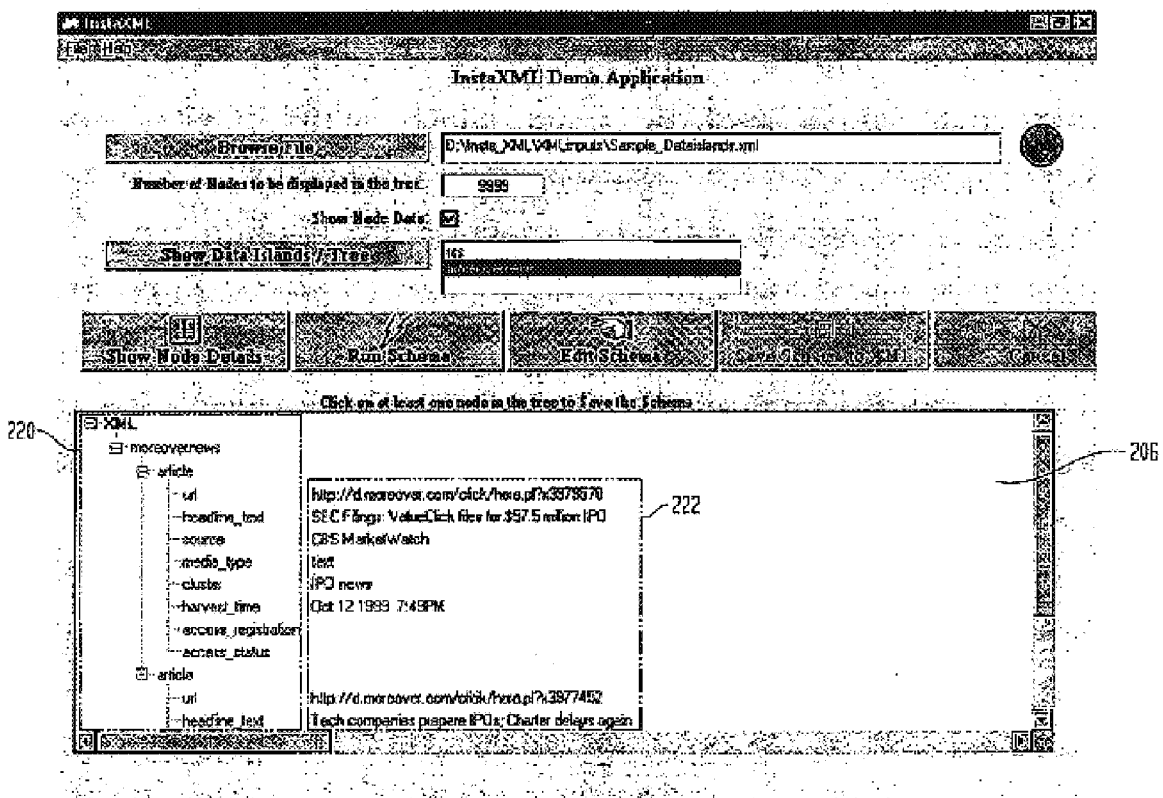
FIG. 18 is a depiction of the user interface further showing node details for one of the data islands associated with the XML file.
Figure 19:
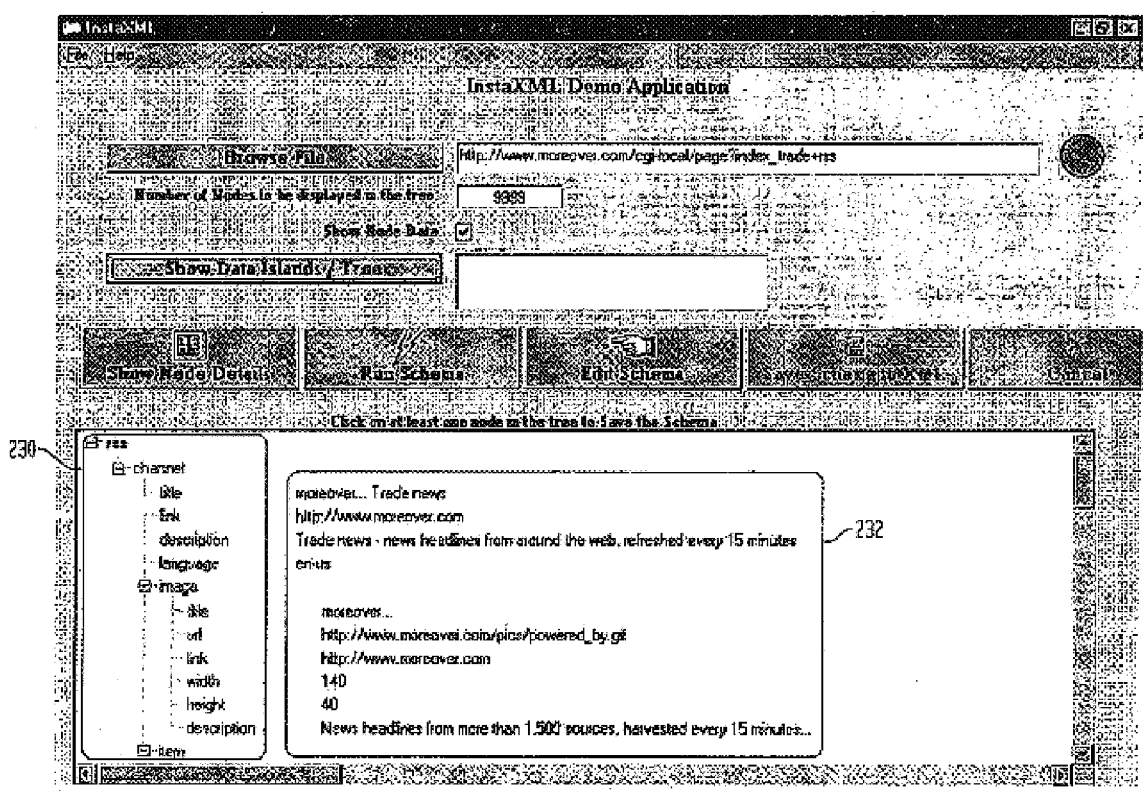
FIG. 19 is a depiction of the user interface displaying tree nodes and data from the rss data island shown in FIG. 18.

The program then uses another utility, such as Microsoft supplied MSXML.DLL facilities, to read the XML tree node by node. In addition, a visual image of the XML tree is created for the user. This is preferably done by loading every node into a third party utility software component such as Tree Visualizer sold by Green Tree Software. The user is also given the flexibility of viewing the tree node with and without the data. In FIG. 18, there is shown tree nodes 220 data 222. FIG. 19 displays tree nodes 230 and data 232 from the "rss" data island displayed in FIG. 18.

Once the tree is displayed, the user can click on any tree nodes to serve as identification of tree branches that contain data to be captured at run time. Multiple nodes on different branches can be clicked. All clicked nodes are highlighted for visual identification and easier understanding. A selected node can be de-selected by clicking on it again.

The designer is required to click on only one node from any desired branch. The implied instruction is that all similar branches are also desired. If the design time tree has 50 similar looking branches, the designer has to click only one node in any of 50 branches. The "depth" of the clicked node within the desired branch decides which data within the similar branches will be captured at playback time. Only the data from the clicked node upward, towards and including the root of the tree is captured at playback time.

Figure 20:
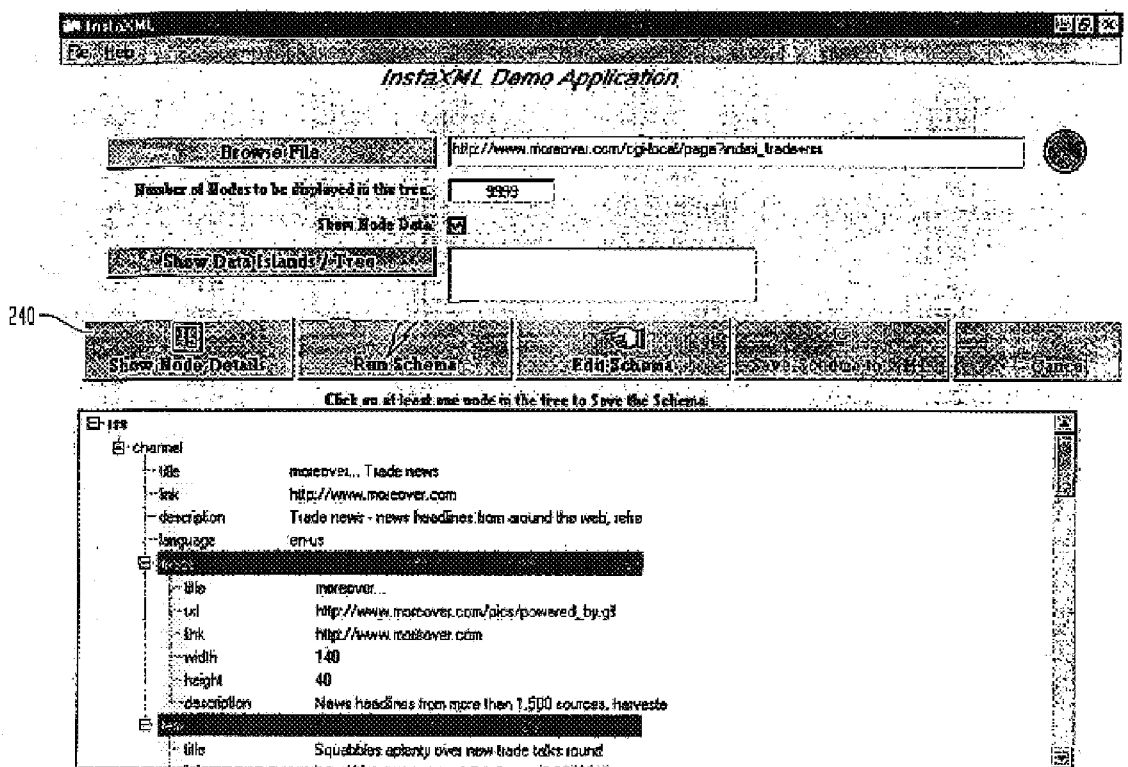
FIG. 20 is a depiction of the user interface showing user-selected nodes which have been highlighted.

After selecting all desired nodes from where the XML data is to be captured at playback time, the user presses the Show Node Details button 240 (FIG. 20). This brings up the screen shown in FIG. 21.

Figure 21:
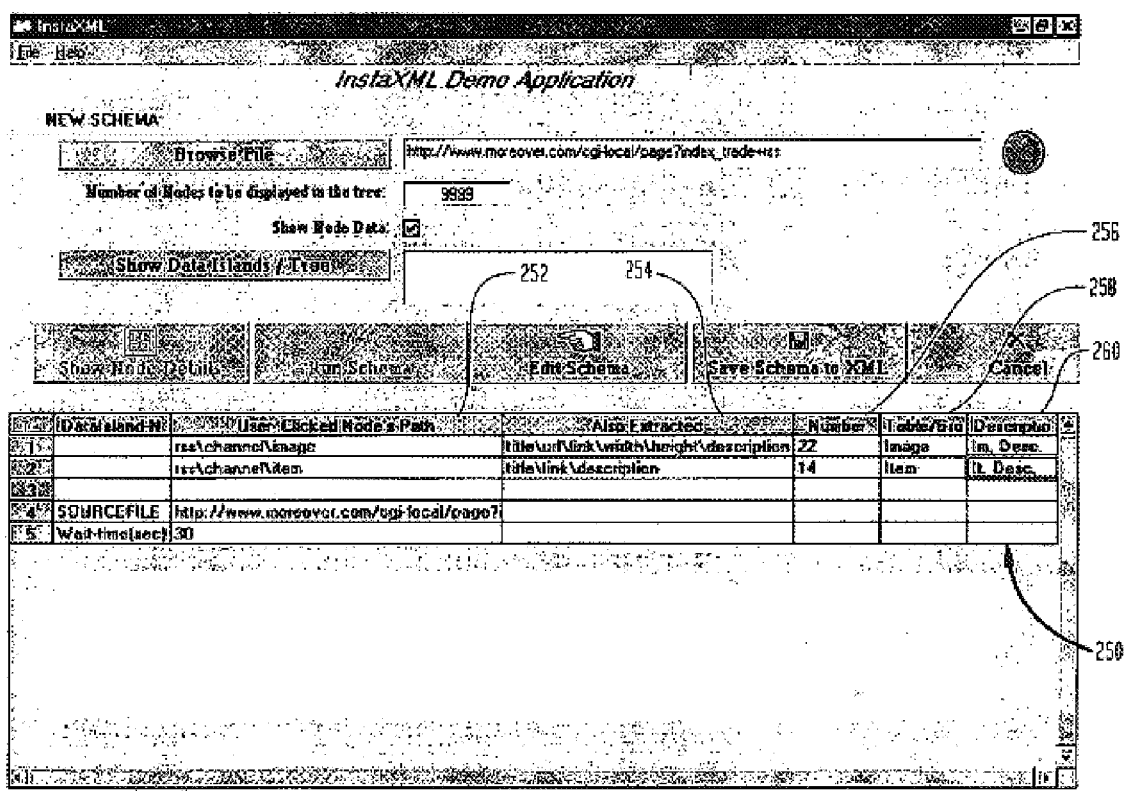
FIG. 21 is a depiction of the user interface showing details of the user-selected nodes from FIG. 20.

The user-clicked nodes' full path up to and including the tree root and also their children or subnode names are saved as a part of the saved instructions. As shown in FIG. 20, the user clicked on "image" and "item" which are displayed, along with their subnodes, in far point grid 250 (FIG. 21). The details of the user clicked node in the Visual Tree are shown in the far point grid 250. The user clicked Node's path and also their immediate subnodes' path are shown in columns 252 and 254. The number of rows the user wishes to capture for each path is specified in number column 256. The Node Name is specified in Table/Grid column 25B. A description is entered in description column 260. Wait-time for the response from the Web site at run time is also specified.

Thus, as shown in FIG. 21, for every clicked node, the designer can specify the number of rows he wishes to extract at playback time, a meaningful business name for the whole table of relational data to be generated at run time, and a description. The user can also specify the number of seconds he wishes to wait for the response from the Web site at runtime.

Figure 23:
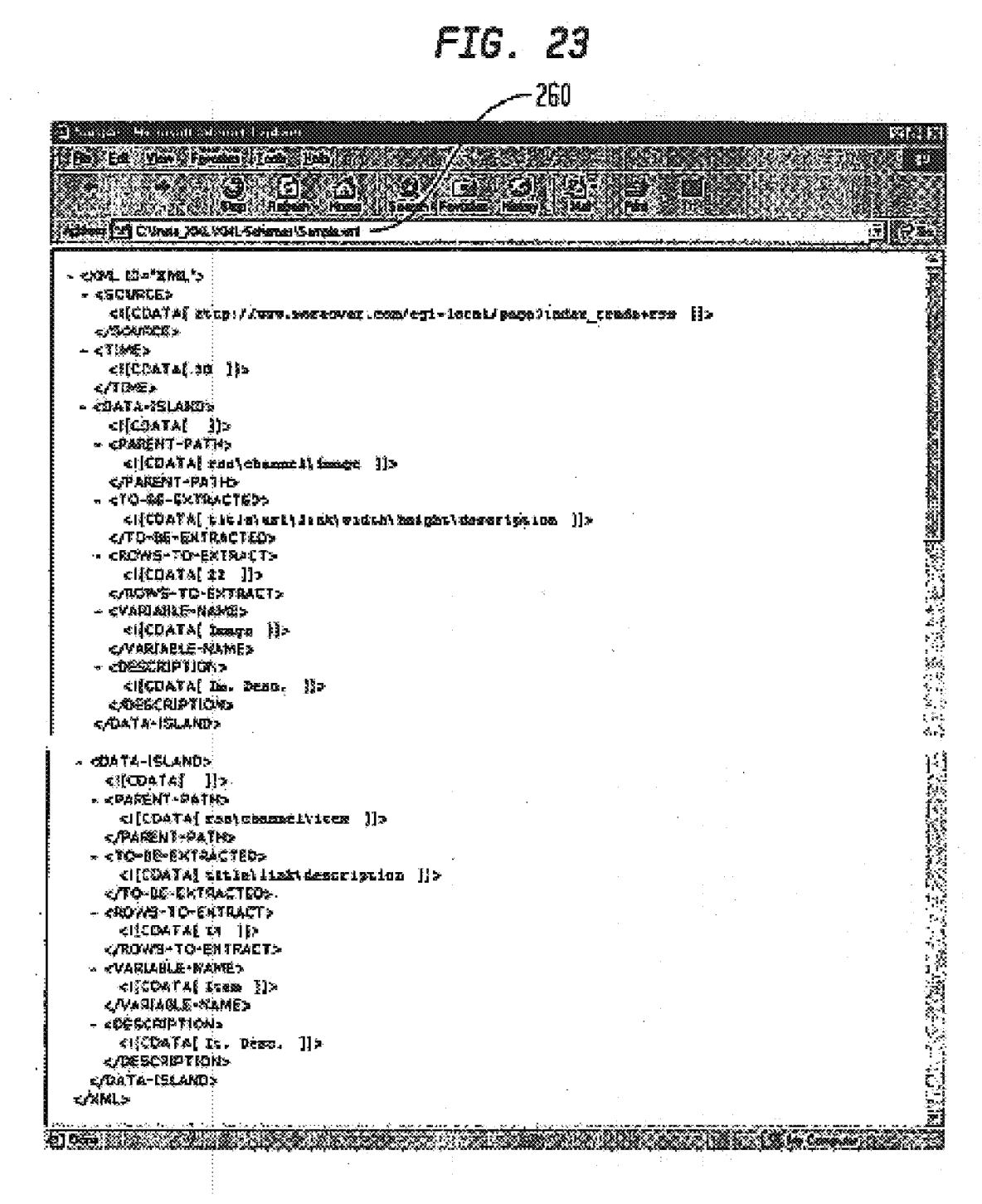

These form a complete set of instructions, which is saved in a file, preferably as a XML schema file. FIG. 22 shows the items which are written to the schema file. FIG. 23 shows how the schema file looks when it is saved, which in this case was saved in the file "sample.xml" shown in address box 260.

Figure 24:
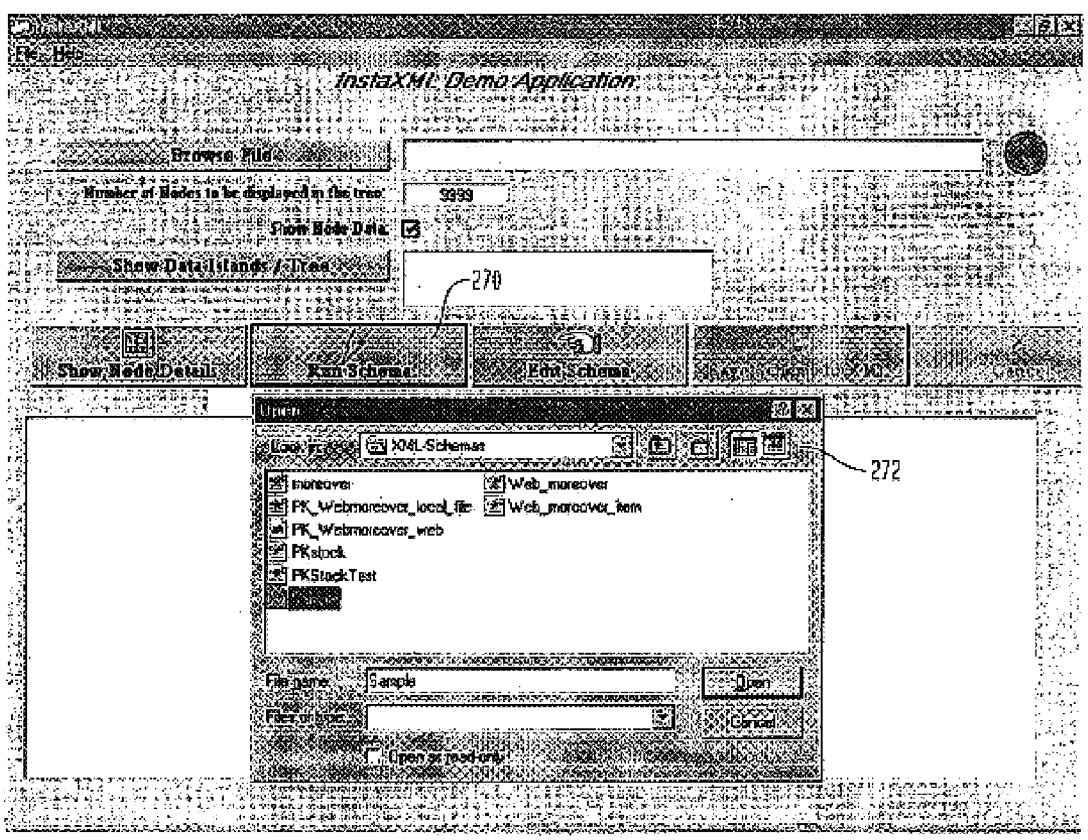
FIG. 24 is a depiction of the user interface showing a user opening a previously-saved file to be used in connection with the playback mode.

In the playback phase, the end user identifies a saved schemas that is to be executed. As shown in FIG. 24, after clicking on the Run Schema button 270, the program opens the user specified schema file from the open box and reads the saved instructions from the file. It then navigates to that particular Web site or opens the file to get the live XML data. The XML data is then loaded, preferably into the Microsoft supplied MSXML.DLL as a Document. If the XML data fails to load within the time specified by the designer, the program returns back to the calling application with appropriate error messages. One example of why such failures may occur is a Web server being down.

Figure 25:
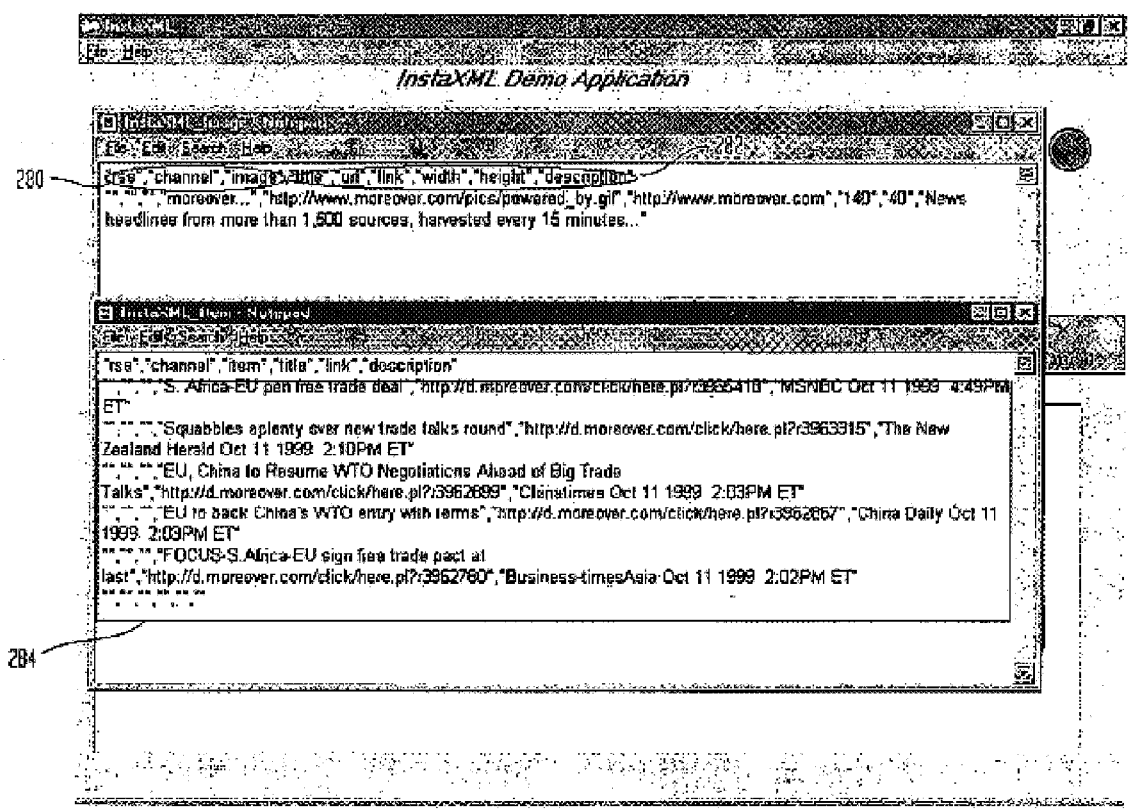
FIG. 25 is a depiction of two files showing the final relational version of the data extracted in accordance with a second embodiment of the present invention.

Once the XML data is loaded successfully in the MSXML document, the data is retrieved node by node from the top, preferably using Microsoft supplied methods. For each of the user clicked node path in the schema, a relational table is created in the user-specified name (Table-Name), which is retrieved from the saved schema. As shown in FIG. 25, the Parent-Path 280 and the To-Be-Extracted Path 282 for that clicked node form the Columns of the relational table.

For every retrieved node, if the node's name falls within any of the designer specified "paths" saved in the schema, that node's data is written to the same named column in the appropriate user specified table. If the node's name falls outside the designer specified path, that node's data is ignored.

This process of retrieving the next node and inspecting it continues node-by-node until the traversal reaches a node having the same node as the clicked node. At this point, the data from all of the children nodes is also written out to their corresponding column names in the tables being filled. The node inspection process stops when the end of the XML data is encountered or the number of nodes specified by the designer have been written out to the tables. The tables are created in user specified names, which, in this example are Image and Item.

When all the user clicked nodes path are traversed for data the program, returns to the calling application with a set of relational tables, one each for each of the user clicked selections.

If needed, for testing purposes, the program can show the final relational version of the retrieved, filtered and tabularized data in an application such as in Microsoft's supplied Notepad utility shown in FIG. 25.

The first line in the output corresponds to the column names and the following lines have data.

The XML extraction method of the present invention can be used as a stand-alone program or can be implemented as a utility subprogram inside any other program to retrieve, filter and convert into tables any XML data from any source, Website or files.

With both embodiments of the present invention, after the data has been captured and brought back for further processing to be specified by the user, it is preferred that such information is further processed by a program such as InstaKnow™, offered by InstaKnow Inc. of Edison, N.J., set forth in detail in provisional application Nos. 60/174,747, 60/166,247 and 60/171,143, the disclosures of which are incorporated by reference herein. Such software is capable of specifying business logic/processes using a point-and-click, wizard-based interface, without needing a programmer. This enables business solutions to be deployed much faster than the competing solutions, reducing solutions costs dramatically.

Complexity involved with high-level language programming is eliminated with the present invention. With minimal initial one time training, a user can use the present embodiment's point-and-click interfaces to achieve advanced business computing, information management, and knowledge management results, as long as the user has a clear understanding of the business. The "business" can be any industry, segment or market including commerce, academics areas of any manufacturing, service, information or knowledge oriented institutions.

With the various preferred embodiments of the present invention, the technologies and capabilities achieved include automated capture/entry of data on live HTML Web (Internet/Intranets) pages and automated capture/entry of data on live XML Web (Internet/Intranets) pages.

The present invention provides a method to capture useful and latest business data from the Internet, Intranets and Extranets. Most preferably, it is implemented via a program running on a user's computer. The program can be stored on any type of recordable media (e.g., floppy disk, hard disk, ROM, RAM) and instructs a user's computer in the typical fashion, with the present invention, the program learns which Web pages are of interest to the user, how to reach (navigate to) those Web pages and which business information of those pages is of interest to the user. These steps are recorded and saved in a schema file. From that point on, when requested by a program or a user, the program can automatically repeat the saved Web navigation and data extraction steps and capture the latest instance of the changed business data from the same pages as originally taught by the user. In effect, the present invention is capable of surfing the Web without human assistance.

When the HTML layout of the involved Web pages changes (as it does every few minutes on any commercial Internet page showing a banner ad, for example), the present invention intelligently accommodates the changes and adjusts itself to get the correct business information from the new pages in spite of the layout change. If the layout has changed so drastically that the business information is no longer present on that page, the present invention will provide an error message.

This present invention provides the capabilities of automatically navigating to pre-requested Web pages and automatically entering data and clicking on pre-requested buttons or links. The advantages of such Internet automation include unattended, continuous monitoring of real time business information, and automatic surfing, 10 to 1000 times faster than human interaction with the Web The present invention is preferably build on Microsoft supplied generic basic technologies and components, although any other equivalent components can be used to achieve the same results. Preferred components for the HTML extraction program include: Visual Basic 6.0 IDE; Web Browser Control, SHDOCV.DLL, and MSHTML.DLL. Preferred components for the XML extraction program include Visual Basic 6.0 IDE and MSXML.DLL. Visual Basic 6.0 IDE is a generic object oriented programming language. Equivalents are C++, VC++, and Java. Web Browser Control (Shdocvu.dll) is a generic tool supplied by Microsoft to provide a browser interface to the Web under a program's control. Mshtml.dll is a generic tool supplied by Microsoft to convert an HTML Web page into a program understandable list of HTML tags and their values. Equivalents are third party tools like the "Internet tool pack" from Crescent Technologies. These tools are the interface layer that allow a program to read the browser's current content and detect where the user clicked on the Web page in the browser. They also provide a programmatic interface to automatically fill information on the browser and simulate user actions like clicks. Msxml.dll is a generic XML parser supplied by Microsoft. Many other equivalents are available from all leading software manufacturers like IBM and Sun Microsystems, and Netscape.

The present invention can also be configured to extract the entire text from a non-HTML page, such as a Word, Excel or PDF file. In this case, an "Extract Entire Text" option can be provided to get the entire content of the page. In this case, only a Page ID needs to be provided and one would check the "body tag" for extraction.

As these and other variations and combinations of features discussed above can be utilized without departing from the present invention as defined by the claims, the foregoing description of the preferred embodiments should be taken by way of illustration rather than by way of limitation of the present invention.

What is claimed is:

1. A computer-implemented method for automated data extraction from a Web site, comprising:
   (a) navigating to a Web site during a design phase;
   (b) extracting data elements associated with said Web site and producing a visible display corresponding to said extracted data elements;
   (c) selecting and storing at least one Page ID data element in said display from said data elements;
   (d) selecting and storing one or more Extraction data elements in said display;
   (e) selecting and storing at least one Base ID data element having an offset distance from said Extraction elements;
   (f) setting a tolerance for possible deviation from said offset distance; and
   (g) renavigating to said Web site during a playback phase and extracting data from said Extraction data elements if said Page ID data element is located in said Web site and if said offset distance of said Base ID data element has not changed by more than said adjustable tolerance.

2. A method as claimed in claim 1, wherein user-specific information is entered into said Web site and used in connection with producing the data to be extracted from said Extraction data elements.

3. A method as claimed in claim 1, wherein said data elements comprise HTML elements.

4. A method as claimed in claim 1, wherein said visible display comprises a grid containing rows and columns including information about each said data elements extracted.

5. A method as claimed in claim 4, wherein said information comprises, for each said data element, fixed information of grid row number, HTML tag number and visible text, and user-selected information of Page ID, Base ID, Extract and tolerance.

6. A method as claimed in claim 1, wherein a position of said Page ID data element within said Web site is stored and said extracting occurs during said playback phase if said Page ID data element has not changed said position.

7. A method as claimed in claim 1, wherein said Page ID data element is selected as a data element that is unlikely to change position upon reformatting of said Web site.

8. A method as claimed in claim 1, wherein said display contains data desired to be extracted.

9. A computer-implemented method for automated data extraction from a Web site, comprising:
   (a) navigating to a Web site during a design phase;
   (b) extracting data elements associated with said Web site and producing a visible current display grid corresponding to said extracted data elements;
   (c) selecting and storing at least one Page ID data element in said current display from said data elements;
   (d) selecting and storing one or more Extraction data elements in said current display;
   (e) selecting and storing at least one Base ID data element in said current display having an offset distance from said Extraction elements;
   (f) entering a tolerance in said current display for possible deviation from said offset distance;
   (g) displaying a playback display grid during a playback phase with said selected Page ID data element, said Extraction data elements, and said Base ID data element;
   (h) renavigating to said Web site;
   (i) extracting data elements associated with said Web site to said visible current display grid;
   (j) comparing said extracted data elements in said current display grid with said playback display grid and extracting data from said Extraction data elements if said Page ID data element is found in said current display grid and if said offset distance of said Base ID data element has not changed by more than said tolerance; and
   (k) adjusting said tolerance based on said offset distance of said Extraction elements found during renavigation.

10. A method as claimed in claim 9, wherein said tolerance comprises a forward and backward tolerance.

11. A computer-implemented method for automated browsing of Web sites on a global communications network and for extracting usable data, comprising:
   (a) accessing at least one Web site page containing data, wherein said data comprises a plurality of data formats;
   (b) transforming said data in a plurality of formats into a computer-readable list;
   (c) identifying a base data element from said list;
   (d) identifying an offset from said base data element to the usable data; and
   (e) extracting the usable data for use by a user regardless of changes to the Web site, provided that said offset between said base data element and the usable data does not change.

12. The method of claim 11, wherein identifying said offset comprises identifying said offset during a design phase and saving said offset for use in a run time phase including said extracting of said usable data.

13. A computer-implemented method for automated browsing Web sites and for extracting usable data, comprising:
   (a) filling a current display grid with rows of HTML data elements from at least one Web site page currently selected by a Web browser;
   (b) displaying in a playback display grid previously-stored HTML data elements;
   (c) examining said rows of said playback grid to locate an HTML data element previously selected as a Page ID data element;
   (d) comparing said rows of said current grid to locate an HTML element that matches said Page ID data element;
   (e) examining said rows of said playback grid to locate HTML data elements previously selected as Extraction data elements and a Base ID data element used as a reference for locating said Extraction data elements;
   (f) comparing said rows of said current grid to locate HTML elements that match said Extraction data elements and match said Base ID data element;
   (g) extracting data from said Extraction data elements regardless of changes to said Web site, provided that said Page ID elements match and any offset between said Base ID elements is within a predetermined tolerance; and,
   (h) resetting said tolerance based on said offset of said Base ID elements.

14. A computer-based system for automatically browsing Web sites, comprising a client computer and a server computer for receiving requests from said client computers over a network connecting said client and server computers, said client computer running an application to:
   (a) navigate to a Web site during a design phase;
   (b) extract data elements associated with said Web site and produce a visible display corresponding to said extracted data elements;
   (c) select and store at least one Page ID data element in said display from said data elements;
   (d) select and store one or more Extraction data elements in said display;
   (e) select and store at least one Base ID data element having an offset distance from said Extraction elements;
   (f) set an adjustable tolerance for possible deviation from said offset distance;
   (g) renavigate to said Web site during a playback phase and extract data from said Extraction data elements if said Page ID data element is located in said Web site and if said offset distance of said Base ID data element has not changed by more than said tolerance; and
   (h) reset said tolerance based on changes to said Web site found during renavigation.

15. A computer-implemented method for automated data extraction, comprising:
   (a) identifying selections of data elements in one of a plurality of data formats for extraction from a source of data comprising data stored in one of said plurality of formats;
   (b) storing information related to said identified selections of data elements in XML format for subsequent use;

(c) acquiring said source of data and retrieving said data elements;

(d) comparing said retrieved XML data elements to said identified selections and extracting only the data from said data elements that correspond to said identified selections; and (e) reformatting said extracted XML data into a relational format.

16. A method as claimed in claim 15, wherein said source of said data is a Web site.

17. A method as claimed in claim 15, wherein said source of said data is a file.

18. A method as claimed in claim 15, including saving said extracted data into a relational data table.

19. A method as claimed in claim 15, wherein said reformatted extracted data is passed to a calling application.

20. A computer-implemented method for automated XML data extraction, comprising:

(a) navigating to a Web site including a plurality of web pages containing XML data;

(b) identifying selections of XML data elements for extraction from said Web site from said plurality of pages, said XML data comprising data elements containing said data stored in XML format;

(c) storing information related to said identified selections of XML data elements for subsequent use;

(d) re-navigating to said Web site and retrieving said XML data elements from said plurality of web pages;

(e) comparing said retrieved XML data elements to said identified selections and extracting only the data from said XML data elements that correspond to said identified selections; and (f) reformatting said extracted XML data into a relational format.

21. A method as claimed in claim 20, including saving said extracted data into a relational data table.

22. A computer-implemented method for automated XML data extraction, comprising:

(a) navigating a client computer to a Web site including a plurality of web pages, said Web site containing XML data;

(b) generating a graphical tree structure on said client computer to display XML nodes and subnodes representing said XML data at said plurality of web pages on said Web site;

(c) selecting one or more of said nodes and/or subnodes from said tree structure associated with the data to be extracted;

(d) storing information related to said selected nodes and/or subnodes;

(e) renavigating said client computer to said Web site and retrieving said XML data using said information;

(f) comparing said retrieved XML data with said selected nodes and/or subnodes and extracting only the data corresponding to said selected nodes and/or subnodes; and (g) reformatting said extracted XML data into a relational format.

23. A method as claimed in claim 22, wherein selecting one subnode under a parent node automatically selects all subnodes under said parent node.

24. A computer readable medium storing a set of instructions for controlling a computer to automatically extract desired XML data from a source of data in a plurality of formats, said medium comprising a set of instructions for causing said computer to:

(a) identify selections of data elements for extraction from a source of data comprising data stored in a plurality of formats;

(b) store information related to said identified selections of data elements for subsequent use;

(c) acquire said source of data and retrieve said data elements in XML format;

(d) compare said retrieved XML data elements to said identified selections and extract only the data from said data elements that correspond to said identified selections; and (e) reformat said extracted XML data into a relational format.

25. A computer-based system for automated XML data extraction, comprising a client computer and server computer for receiving requests from said client computer over a network connecting said client and server computers, said client computer running an application to:

(a) identify selections of XML data elements for extraction from a plurality of sources of XML data contained at said server computer;

(b) store information related to said identified selections of XML data elements for subsequent use;

(c) acquire said plurality of sources of XML data and retrieve said XML data elements from said plurality of sources;

(d) compare said retrieved XML data elements to said identified selections and extract only the data from said XML data elements that correspond to said identified selections; and (e) reformat said extracted XML data into a relational format.

26. A computer-implemented method for automated data extraction from a Web site, comprising:

(a) navigating to a Web site during a design phase;

(b) extracting data elements associated with said Web site and producing a visible display corresponding to said extracted data elements;

(c) selecting and storing at least one Page ID data element in said display from said data elements;

(d) selecting and storing one or more Extraction data elements in said display;

(e) selecting and storing at least one Base ID data element having an offset distance from said Extraction elements;

(f) setting an adjustable tolerance for possible deviation from said offset distance; and, (g) renavigating to said Web site during a playback phase and extracting data from said Extraction data elements if said Page ID data element is located in said Web site and adjusting said tolerance based on said offset distance of said Base ID data element.

27. A method as claimed in claim 26, wherein user-specific information is entered into said Web site based on said adjustable tolerance and said offset.

28. A method as claimed in claim 26, wherein said adjustable tolerance is reset based on renavigation of said Web site during said playback phase.

29. A method as claimed in claim 26, wherein user-specific information is entered into said Web site and used in connection with producing the data to be extracted from said Extraction data elements.

30. A method as claimed in claim 26, wherein said visible display comprises a grid containing rows and columns including information about each said data elements extracted.

31. A method as claimed in claim 29, wherein said information comprises, for each said data element, fixed information of grid row number, HTML tag number and visible text, and user-selected information of Page ID, Base ID, Extract and tolerance.

32. A method as claimed in claim 26, wherein a position of said Page ID data element within said Web site is stored and said extracting occurs during said playback phase if said Page ID data element has not changed said position.

33. A method as claims in claim 26, wherein said data elements are extracted from a Web page embedding at least one of the following formats: XML, PDF, Word, and Excel.

* * * * *